US012807246B2

(12) United States Patent
Hosozawa et al.

(10) Patent No.: US 12,807,246 B2
(45) Date of Patent: Nov. 24, 2026

(54) WORKING VEHICLE

(71) Applicant: Kubota Corporation, Osaka (JP)

(72) Inventors: Hiroaki Hosozawa, Fremont, CA (US); Shotaro Kawahata, Fremont, CA (US); Yusuke Murata, Fremont, CA (US)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 19/234,673

(22) Filed: Jun. 11, 2025

(65) Prior Publication Data

US 2026/0084763 A1 Mar. 26, 2026

Related U.S. Application Data

(60) Provisional application No. 63/698,152, filed on Sep. 24, 2024.

(51) Int. Cl.
*B62D 49/06* (2006.01)
*A01B 59/043* (2006.01)
(Continued)

(52) U.S. Cl.
CPC ............ *B62D 49/06* (2013.01); *A01B 59/066* (2013.01); *B60K 35/10* (2024.01); *G07C 5/02* (2013.01);
(Continued)

(58) Field of Classification Search
CPC .................... B62D 49/06; B60K 35/10; B60K 2360/1438; G07C 5/02; B60L 2200/40
See application file for complete search history.

(56) References Cited

U.S. PATENT DOCUMENTS 4,475,159 A * 10/1984 Gerstenmaier ..... B60T 8/17616 303/174
5,335,178 A * 8/1994 Schafer ..................... B60L 3/10 318/52
(Continued)

FOREIGN PATENT DOCUMENTS

WO WO-2023094574 A1 * 6/2023 .............. G01S 11/02

OTHER PUBLICATIONS

Machine translation of DE19748251 downloaded from Espacenet Jun. 25, 2026 (Year: 2026).*
(Continued)

*Primary Examiner* — Kito R Robinson
*Assistant Examiner* — Tanya C Sienko
(74) *Attorney, Agent, or Firm* — Keating & Bennett, LLP

(57) ABSTRACT

A working vehicle includes a traveling vehicle body, a traveling device to support the traveling vehicle body such that the traveling vehicle body is allowed to travel, a coupler to couple a heavy object to the traveling vehicle body, a memory or storage to store information, a parameter definer configured or programmed to perform a definition process to define a traveling parameter indicating a relation between a rotation of the traveling device and a traveling distance of the traveling vehicle body based on an actual traveling state of the traveling device, and store in the memory or storage, the traveling parameter associated with attachment information of the heavy object coupled with the coupler, and an assistor configured or programmed to assist at least one of traveling or work based on the traveling parameters stored in the memory or storage.

13 Claims, 23 Drawing Sheets

(51) Int. Cl.
*A01B 59/06* (2006.01)
*B60K 35/10* (2024.01)
*G07C 5/02* (2006.01)

(52) U.S. Cl.
CPC ..... *A01B 59/043* (2013.01); *B60K 2360/1438* (2024.01); *B60L 2200/40* (2013.01)

(56) References Cited

U.S. PATENT DOCUMENTS

| | | | | |
|---|---|---|---|---|
| 10,589,738 | B1 * | 3/2020 | Boecker | B60W 30/02 |
| 2007/0179735 | A1 * | 8/2007 | Fiedler | B60T 8/885<br>702/150 |
| 2015/0105965 | A1 * | 4/2015 | Blackwell | A01B 59/002<br>701/28 |
| 2019/0351910 | A1 * | 11/2019 | Kassen | B60W 10/12 |
| 2020/0189567 | A1 * | 6/2020 | Silver | B60W 10/04 |
| 2021/0274700 | A1 * | 9/2021 | Birkland | A01B 79/005 |
| 2024/0182019 | A1 * | 6/2024 | Gao | B60W 30/045 |
| 2024/0286615 | A1 * | 8/2024 | Salif | B60W 10/04 |
| 2024/0391434 | A1 * | 11/2024 | Bora | B60T 8/175 |

OTHER PUBLICATIONS

"Tractor Wheel Slip Measurement and Optimization" by M Chowdhury and A. Kushwah. Futuristic Trends in Agriculture Engineering a& Food Sciences IIP Proceedings, vol. 2 Book 9 Chapter 19. Copyright 2022 (Year: 2022).*

* cited by examiner

| Attachment information | | | | Traveling parameters | | | |
|---|---|---|---|---|---|---|---|
| First attachment information | Second attachment information | Third attachment information | Fourth attachment information | First traveling parameter | Second traveling parameter | Third traveling parameter | Fourth traveling parameter |
| Attachment with Lifting device : NO | | | | **** | **** | **** | **** |
| Attachment with Lifting device : NO | | | | | | | |
| Attachment with Lifting device : YES | Cultivator | Second heavy object | Fourth heavy object | **** | **** | **** | **** |
| Attachment with Attaching device : YES | Weight | First heavy object | Fourth heavy object | | | | |
| Attachment with Lifting device : YES | Large bailing device | Second heavy object | Third heavy object | **** | **** | **** | **** |
| Attachment with Attaching device : NO | | | | | | | |
| Attachment with Lifting device : YES | Mower | Second heavy object | Fourth heavy object | **** | **** | **** | **** |
| Attachment with Attaching device : NO | | | | | | | |
| ⋮ | | | | ⋮ | | | |

Fig.9

WORKING VEHICLE

CROSS-REFERENCE TO RELATED APPLICATIONS

This application claims the benefit of priority to U.S. Provisional Patent Application No. 63/698,152 filed on Sep. 24, 2024. The entire contents of this application is hereby incorporated herein by reference.

BACKGROUND OF THE INVENTION

1. Field of the Invention

The present invention relates to working vehicles such as tractors.

2. Description of the Related Art

In a tire analysis method and tire analysis system disclosed in International Publication WO 2023/094574 A1, when a tractor travels along a straight line, a first rotation sensor measures the rotation number of front wheels of the tractor, a second rotation sensor measures the rotation number of rear wheels, and a controller uses the total rotation number of those rotation numbers above and defines characteristic parameters of the tractor.

SUMMARY OF THE INVENTION

In the tire analysis method and tire analysis system disclosed in International Application No. 2023/094574, it is possible to determine characteristic parameters of the tractor. However, a load acting on a traveling device may vary according to an attachment of a heavy object such as a working device (implement) attached to the tractor. When the load acting on the traveling device varies, defined characteristic parameters may depart from actual characteristic parameters.

Example embodiments of the present invention provide working vehicles each operable to appropriately assist either traveling or work or both even when a load acting on a travelling device varies due to a heavy object attachment thereto.

A working vehicle according to an example embodiment of the present invention includes a traveling vehicle body, a traveling device to support the traveling vehicle body such that the traveling vehicle body is allowed to travel, a coupler to couple a heavy object to the traveling vehicle body, a memory or storage to store information, a parameter definer configured or programmed to perform a definition process to define a traveling parameter indicating a relation between a rotation of the traveling device and a traveling distance of the traveling vehicle body based on an actual traveling state of the traveling device, and store in the memory or storage, the traveling parameter associated with attachment information of the heavy object coupled with the coupler, and an assistor configured or programmed to assist either traveling or work or both based on the traveling parameters stored in the memory or storage.

The attachment information may include at least one of information indicating whether the heavy object is coupled with the coupler, or information of the heavy object being coupled with the coupler.

The attachment information may include information indicating whether the heavy object coupled with the coupler is a first heavy object located at a front side of the traveling vehicle body or a second heavy object located at a rear side of the traveling vehicle body.

The attachment information may include information indicating that the heavy object coupled with the coupler is a third heavy object to be towed by the traveling vehicle body or a fourth heavy object to be supported and moved up and down by the coupler.

The working vehicle may further include an input interface to receive an input of a definition instruction for the parameter definer to perform the definition process, and a controller configured or programmed to control the coupler to move up the fourth heavy object to a predetermined height when the input interface receives the input of the definition instruction in a case where the attachment information indicates the fourth heavy object. The parameter definer is configured or programmed to perform the definition process based on the traveling state when the controller moves up the fourth heavy object to the predetermined height.

The parameter definer is configured or programmed to acquire behavioral information regarding a behavior of the traveling vehicle body corresponding to the traveling state, and determine via the behavioral information whether to perform the definition process based on the traveling state.

The parameter definer is configured or programmed to determine based on the behavioral information whether the traveling vehicle body has traveled on a rough terrain, and not perform the definition process based on the traveling state in a case where the traveling vehicle body has traveled on the rough terrain.

The parameter definer may be configured or programmed to determine based on the behavioral information whether the traveling vehicle body has traveled straight, and not perform the definition process based on the traveling state in a case where the traveling vehicle body has not traveled straight.

The parameter definer may be configured or programmed to determine whether to perform the definition process according to at least one of a surrounding environment of the traveling vehicle body or to a vehicle state of the traveling vehicle body.

The traveling device may include a plurality of wheels spaced away from one another in a front-rear direction or in a width direction. The parameter definer may be configured or programmed to define a relation between rotation numbers of the plurality of wheels and the traveling distance of the traveling vehicle body as the traveling parameters.

The parameter definer may be configured or programmed to define the traveling parameters, each of which corresponds to a respective one of the plurality of the wheels during the definition process, compare the traveling parameters for the plurality of wheels to one another, and determine whether to store each of the traveling parameters in the memory or storage.

The parameter definer may be configured or programmed to compare the traveling parameters for the plurality of wheels, and control the memory or storage not to store the traveling parameters in a case where at least one of a difference or a ratio between the traveling parameters is equal to or more than a predetermined value.

The working vehicle may further include an electric motor to generate rotational driving force to drive the traveling device. The parameter definer may be configured or programmed to acquire the traveling state based on the rotational driving force generated by the electric motor, and perform the definition process based on the traveling state.

The working vehicle may further include an input interface to receive an input of traveling instruction regarding the traveling of the traveling vehicle body via the traveling device. The assistor may be a controller configured or programmed to control the traveling device based on the traveling parameters stored in the memory or storage when the input interface receives the input of traveling instruction.

The heavy object may be one of a working device, a weight, or a battery assembly.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 9 is a diagram showing an example of a parameter table.

DETAILED DESCRIPTION OF THE EXAMPLE EMBODIMENTS

Figure 1:
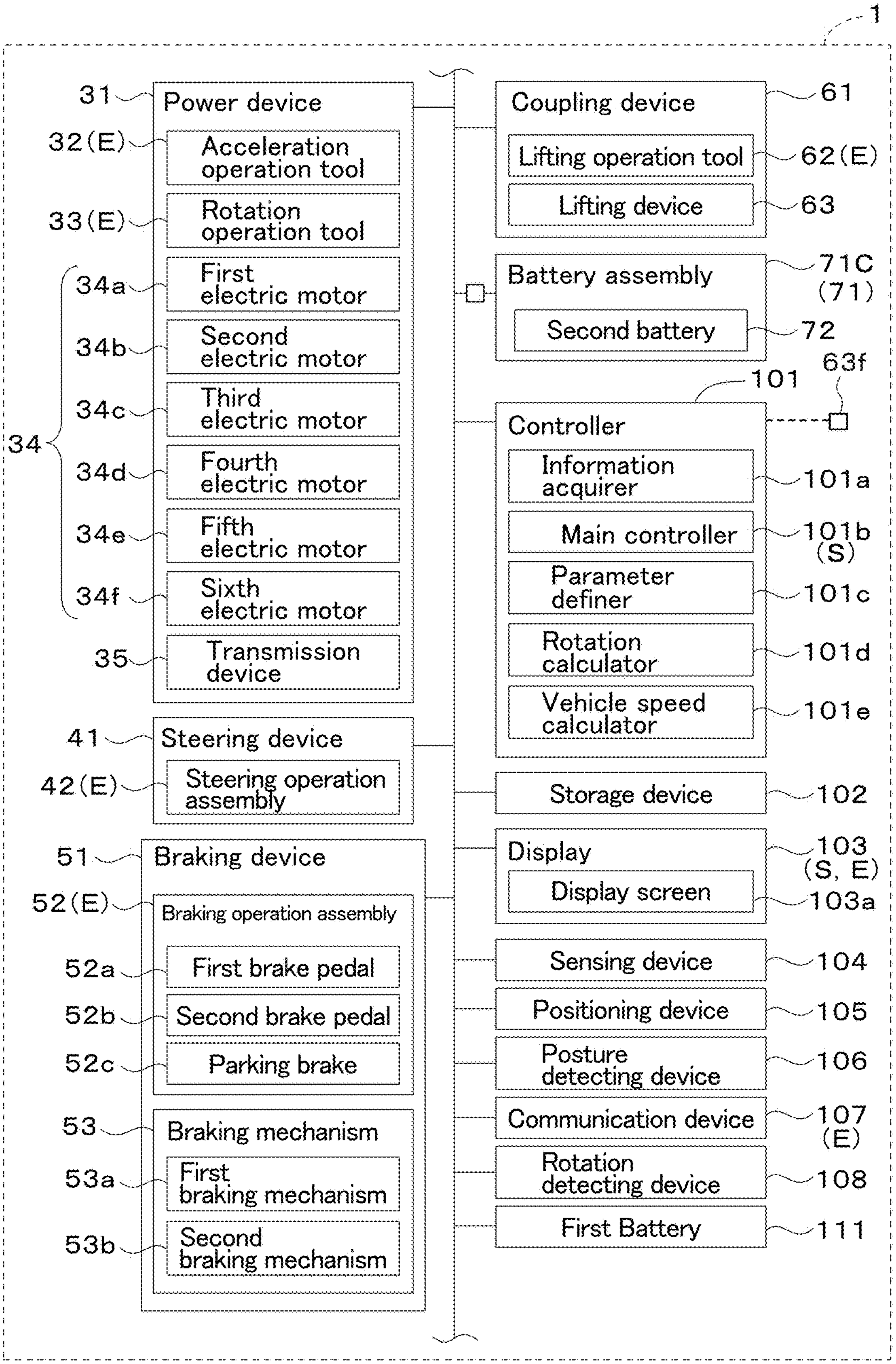
FIG. 1 is a diagram showing an example of a system of a working vehicle.

Example embodiments will now be described with reference to the accompanying drawings, wherein like reference numerals designate corresponding or identical elements throughout the various drawings. The drawings are to be viewed in an orientation in which the reference numerals are viewed correctly.

Figure 2:
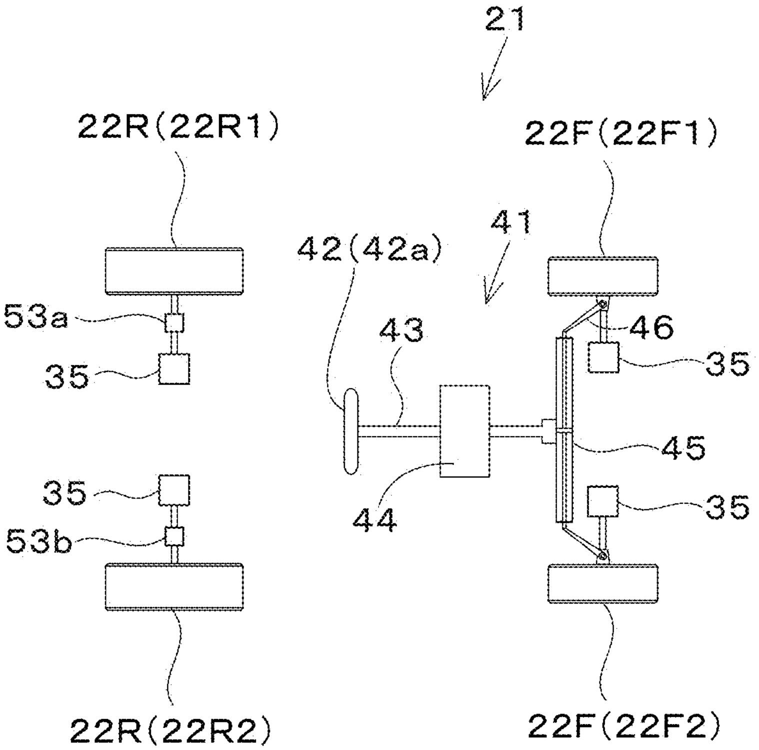
FIG. 2 is a diagram showing an example of devices and pieces of equipment related to traveling via a traveling device.
Figure 3:
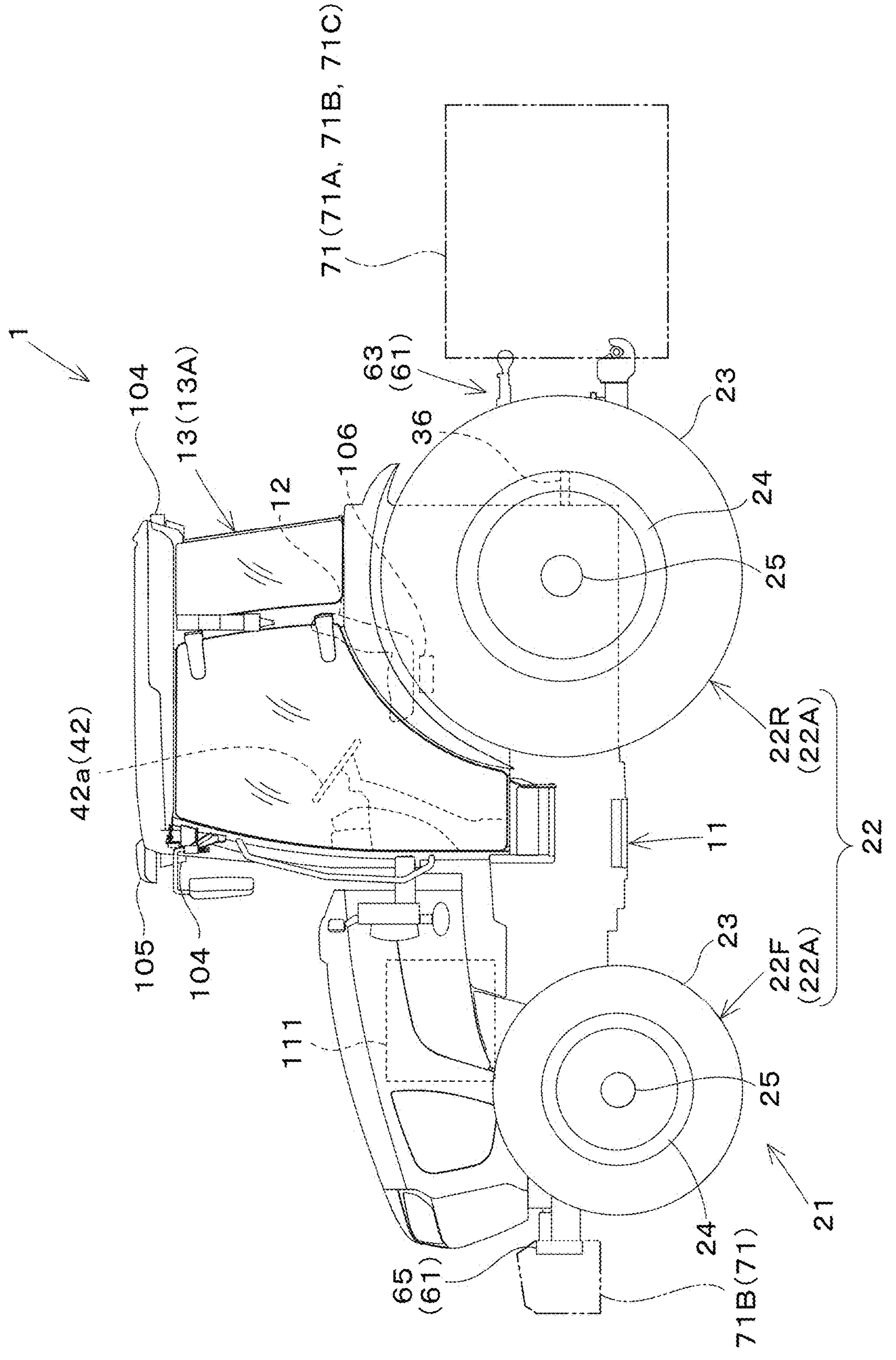
FIG. 3 is a schematic side view showing an example of a working vehicle.
Figure 4:
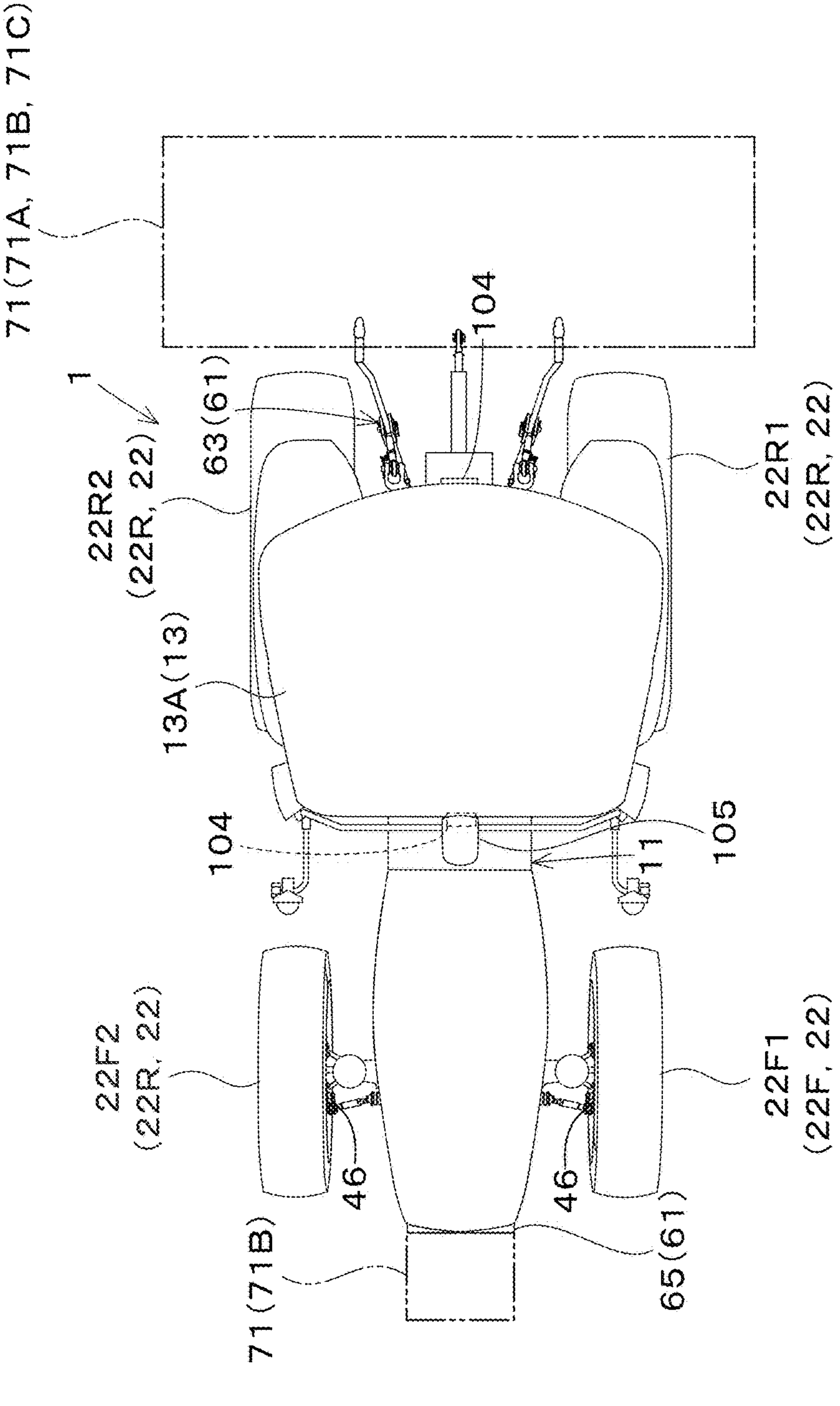
FIG. 4 is a schematic top view showing an example of a working vehicle.

The following describes example embodiments of the present invention with reference to the drawings. FIG. 1 is a diagram showing an example of a system of a working vehicle 1. FIG. 2 is a diagram showing an example of devices and pieces of equipment related to traveling via a traveling device 21. FIG. 3 is a schematic side view showing an example of the working vehicle 1, and FIG. 4 is a schematic top view showing an example of the working vehicle 1. The working vehicle 1 is a vehicle to travel via a traveling device 21. In the present example embodiment, the working vehicle 1 is a tractor with a working device 71A (implement) attachable to a traveling vehicle body 11 (chassis). The following discusses the working vehicle 1 and is focused on discussing a tractor operating via manual control of an operator seated on a driver seat 12 included in the working vehicle 1.

While detailed description will be omitted, the working vehicle 1 may operate via an automatic operation control not relying on manual control from the operator, or may operate via remote operation by manual control using a remote controller from a remote location. The working vehicle 1 need only be able to travel via the traveling device 21, and may be detachably coupled with the heavy object 71 such as a working device 71A, which is not limited to a tractor. For example, the working vehicle 1 may be a construction machine such as a compact track loader or a backhoe which is detachably coupled with a working device (attachment).

In the following description, a direction that the operator seated on the driver seat 12 of the working vehicle 1 faces (left side of FIGS. 3 and 4) is called front, and an opposite direction (right side of FIGS. 3 and 4) is called rear. A left side of the operator (near side of FIG. 3 and lower side of FIG. 4) is called left, and a right side of the operator (far side of FIG. 3 and upper side of FIG. 4) is called right. A horizontal direction perpendicular to a front-rear direction is called a width direction. The direction perpendicular to the horizontal direction is called an up-down direction.

As shown in FIGS. 3 and 4, the working vehicle 1 includes the traveling vehicle body 11 and the traveling device 21. The traveling vehicle body 11 supports various devices and pieces of equipment included in the working vehicle 1. For example, the traveling vehicle body 11 includes the driver seat 12, and a protection mechanism 13 to protect the driver seat 12. The protection mechanism 13 may be, for example, a cabin 13A surrounding the periphery of the driver seat 12. The protection mechanism 13 is not limited to the cabin 13A, and may be a canopy, or a ROPS provided at the rear of the driver seat 12.

The traveling device 21 supports the traveling vehicle body 11 to travel. The traveling device 21 imparts a driving force to the traveling vehicle body 11 by driving. The traveling device 21 includes one or more wheels 22 rotatable via a power supplied from a power device 31. In the present example embodiment, the traveling device 21 includes a plurality of wheels 22, which are spaced away from one another in the front-rear direction or in the width direction. The traveling device 21 includes a pair of wheels 22F (front wheels) to support the front of the traveling vehicle body 11, and a pair of wheels 22R (rear wheels) to support the rear of the traveling vehicle body 11. In the example shown in FIGS. 3 and 4, the outer diameter of the rear wheels 22R is larger than the outer diameter of the front wheels 22F. However, the outer diameter of the rear wheels 22R may be designed to have the same or substantially the same outer diameter as the front wheels 22F.

Specifically, a left-side front wheel 22F1 (first front wheel) is spaced away from a right-side front wheel 22F2 (second front wheel) in the width direction. A left-side rear wheel 22R1 (first rear wheel) is spaced away from a right-side rear wheel 22R2 (second rear wheel) in the width direction. The first front wheel 22F1 is spaced away from the first rear wheel 22R1 in the front-rear direction. The second front wheel 22F2 is spaced away from the second rear wheel 22R2 in the front-rear direction.

In the example shown in FIGS. 3 and 4, the plurality of wheels 22 included in the traveling device 21 are wheeled type wheels 22A, each of which includes a tire 23. Each of the wheeled type wheels 22A includes the tire 23, an annular rim 24 with the tire 23 fitted in the outer periphery thereon, and a hub 25 located at the center portion of the tire 23 and with the rim 24 attached to an axle shaft.

Figure 5:
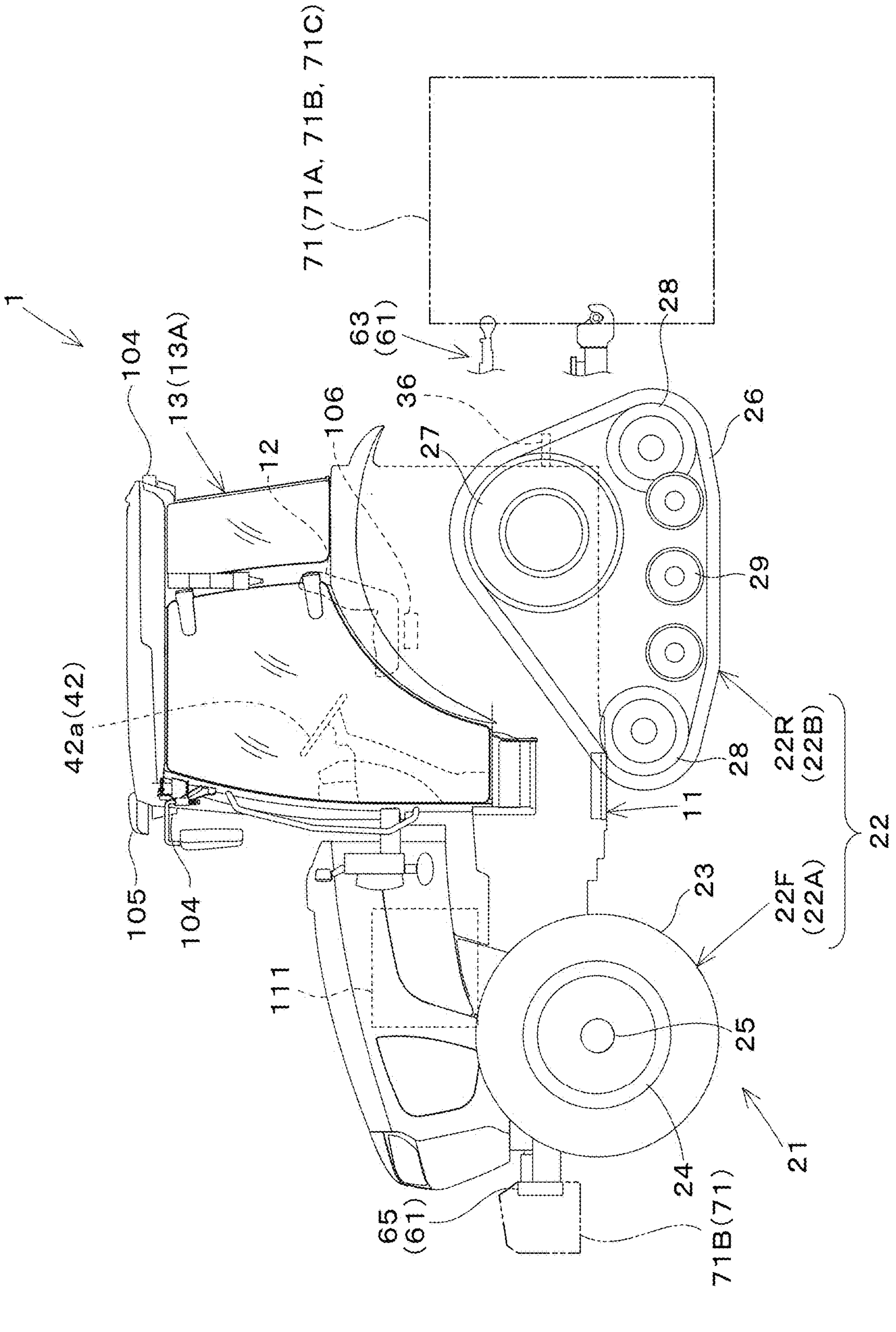
FIG. 5 is a schematic side view showing another example of a working vehicle.

The plurality of wheels 22 are not limited to wheeled type wheels 22A and, as shown in FIG. 5, may be crawler type wheels 22B (track). FIG. 5 is a schematic side view showing another example of the working vehicle 1. The crawler type wheels 22B include a crawler 26, a driving wheel 27 to cause the crawler 26 to drive circularly, and driven wheels 28 rotating in accordance with the circular driving of the crawler 26. The crawler 26 is, for example, a rubber crawler including an elastic body such as rubber. The crawler type wheels 22B may include a plurality of track rollers (idle wheels) 29 in addition to the crawler 26, the driving wheel 27 and the driven wheels 28.

It is preferable for at least a pair of wheels 22 of the plurality of wheels 22 arranged in the width direction to have the same configuration. However, the front wheels 22F may have another configuration different from one of the rear wheels 22R. That is, as for the variation shown in FIG. 5, the front wheels 22F may be wheeled type wheels 22A and the rear wheels 22R may be crawler type wheels 22B, or the plurality of wheels 22 may all be crawler type wheels 22B. The traveling device 21 may not include both the front wheels 22F and the rear wheels 22R, that is a total of four wheels 22, and may use a configuration including only a pair of crawler type wheels 22B in the width direction, that is two crawler type wheels 22B in total. As shown in FIGS. 3 and 4, the following description focuses on a case where all of a plurality of wheels 22 are wheeled type wheels 22A.

The power device 31 is configured to supply power to the traveling device 21. The power device 31 includes, for example, one or more electric motors 34, and drives the traveling device 21 via the power (rotational driving force) generated by the one or more electric motors 34. That is, the working vehicle 1 is an electric working vehicle driven by the electric motor 34. The electric motor 34 is an Interior Permanent Magnet Synchronous Motor (IPMSM), an Electrically Excited Synchronous Motor (EESM), and/or the like. The electric motor 34 drives via the power supplied from a main battery 111 (first battery) provided in the traveling vehicle body 11. The first battery 111 is rechargeable and a secondary battery such as a lithium-ion battery or a lead battery. The first battery 111 includes a plurality of cells therein, which are electrically connected in series and/or in parallel. The power supply path connecting the first battery 111 and the electric motor 34 includes inverters which modifies the current and the voltage of the electric power supplied from the first battery 111 to the electric motor 34.

In the present example embodiment, the power device 31 includes a plurality of electric motors 34 respectively to provide power to each of the wheels 22 provided on the traveling device 21. That is, the power device 31 includes a plurality of electric motors 34 corresponding to each of the wheels 22, and each of the wheels 22 is driven independently via a corresponding electric motor 34. The plurality of electric motors 34 include a first electric motor 34*a* to drive the first front wheel 22F1, a second electric motor 34*b* to drive the second front wheel 22F2, a third electric motor 34*c* to drive the first rear wheel 22R1, and a fourth electric motor 34*d* to drive the second rear wheel 22R2.

The power device 31 may supply power to a device different from the traveling device 21. In the present example embodiment, in addition to a plurality of electric motors 34 to drive four of the wheels 22, the power device 31 includes a fifth electric motor 34*e* to drive a PTO shaft 36 to provide mechanical power to the working device 71A, and a sixth electric motor 34*f* to drive a hydraulic pump which actuates a hydraulic equipment provided in the working vehicle 1. In the present example embodiment, the PTO shaft 36 protrudes rearward from a rear side of the traveling vehicle body 11. The PTO shaft 36 may be provided protruding forward from a front side of the traveling vehicle body 11, and the PTO shaft 36 may be provided rearward and/or forward from the traveling vehicle body 11.

The following discusses the working vehicle 1 with a case where the power device 31 includes a plurality of electric motors 34 respectively to provide power to each of the wheels 22 as an example. However, the power device 31 may include a common electric motor 34 to provide power to a plurality of wheels 22. In such a case, the plurality of wheels 22 drive via power provided from the common electric motor 34. In addition to the plurality of wheels 22, the electric motor 34 may provide power to other devices (such as the PTO shaft 36 or a hydraulic pump), and the number of electric motors 34 included in the power device 31 and the power-receiving devices (wheels 22, PTO shaft 36, and/or the like) are not limited by the example mentioned above.

The output shaft of the electric motor 34 is directly or indirectly connected to the input shaft of a power-receiving device, and transmits the generated power to the power-receiving device. The output shaft of electric motor 34 is, for example, indirectly connected to the output shaft of the power-receiving device via a transmission device 35 including a plurality of gears.

In the present example embodiment, an electric working vehicle including a power device 31 including a plurality of electric motors 34 is discussed as an example. However, the power device 31 may include another prime mover instead of or in addition to the electric motor 34. For example, the power device 31 may include an engine (internal combustion engine) such as a diesel engine or a gasoline engine, and the traveling device 21 may drive via the power supplied from the internal combustion engine.

As shown in FIGS. 1 and 2, the working vehicle 1 includes a steering device 41. The steering device 41 is a device to modify the steering direction and the steering angle (steering angle) of the working vehicle 1. The steering device 41 includes a steering operation assembly 42, a rotation shaft 43, a steering control valve 44, a steering cylinder 45 and arms 46 (steering knuckle arms).

The steering operation assembly 42 includes a steering handle 42*a* (steering wheel). The steering handle 42*a* is provided in the periphery of the driver seat 12 and is operated by the operator seated on the driver seat 12.

The rotation shaft 43 is a steering shaft to rotatably support the steering handle 42*a*.

The steering control valve 44 is supplied with hydraulic fluid discharged by a hydraulic pump, and adjusts the hydraulic fluid supplied to the steering cylinder 45. The steering control valve 44 is, for example, a three-position switching valve switchable via movement of a spool and/or the like, and switches positions according to the steering direction (rotation direction) of the steering shaft 43.

The steering cylinder 45 drives via the hydraulic fluid supplied from the steering control valve 44. The switching position and the opening of the steering control valve 44 switch so that the steering cylinder 45 expands/retracts in one or the other direction of the width direction according to the switching position and opening of the steering control valve 44.

The arms 46 are connected to the steering cylinder 45, to modify the steering (steering direction and angle) of the front wheels 22F by moving based on the expansion and contraction of the steering cylinder 45.

The steering device 41 described above is an example and example embodiments of the present invention are not limited thereto. For example, as in the present example embodiment, the traveling device 21 may modify the driving force of the left wheels in the forward direction which is different from the driving force of the right wheels in the forward direction by driving the electric motors 34 of the left and right wheels in an independent manner such that steering angle is modified. In this configuration, the traveling device 21 may partially cover a function of the steering device 41. The power device 31 may modify the driving force of the electric motors 34 on one side different from the driving force on another side, which eventually change the steering angle according to the rotation angle of the steering handle 42*a* (steering shaft 43).

As shown in FIGS. 1 and 2, the working vehicle 1 includes a braking device 51. The braking device 51 can perform braking of the traveling device 21. In the present example embodiment, the braking device 51 can perform braking of the first rear wheel 22R1 and of the second rear wheel 22R2. The braking device 51 includes a braking operation assembly 52 and a braking mechanism 53.

The braking operation assembly 52 is provided in the periphery of the driver seat 12 and is operated by the operator seated thereon. The braking operation assembly 52 can be embodied as a foot-pedal type or a lever type operation assembly. In the present example embodiment, the braking operation assembly 52 includes a first brake pedal 52*a* to operate braking of the first rear wheel 22R1, a second brake pedal 52*b* to operate braking of the second rear wheel 22R2, and a parking brake (brake lever) 52*c* to operate braking of the first rear wheel 22R1 and of the second rear wheel 22R2.

The braking mechanism 53 is, for example, a disc type brake. The braking mechanism 53 includes a first braking mechanism 53*a* to brake the first rear wheel 22R1, and a second braking mechanism 53*b* to brake the second rear wheel 22R2. The first braking mechanism 53*a* is provided on an axle shaft of the first rear wheel 22R1, and the second braking mechanism 53*b* is provided on an axle shaft of the second rear wheel 22R2.

As the operator operates the first brake pedal 52*a* from the release position to the braking direction, the first braking mechanism 53*a* increases the braking force on the first rear wheel 22R1. On the other hand, as the operator operates the first brake pedal 52*a* from the braking position to the release direction, the first braking mechanism 53*a* decreases the braking force on the first rear wheel 22R1.

As the operator operates the second brake pedal 52*b* from the release position to the braking direction, the second braking mechanism 53*b* increases the braking force performing braking of the second rear wheel 22R2. On the other hand, as the operator operates the second brake pedal 52*b* from the braking position to the release direction, the second braking mechanism 53*b* decreases the braking force on the second rear wheel 22R2.

As the operator operates the parking brake 52*c* from the release position to the braking direction, the first braking mechanism 53*a* and the second braking mechanism 53*b* increase the braking force. On the other hand, as the operator operates the parking brake 52*c* from the braking position to the release direction, the braking mechanism 53 decrease the braking force.

The braking device 51 is not limited to the example mentioned above and, in addition to or instead of the first rear wheel 22R1 and the second rear wheel 22R2, the braking device 51 may perform braking of the first front wheel 22F1 and of the second front wheel 22F2.

The coupling device 61 is configured to connect the heavy object 71 to the traveling vehicle body 11. The heavy object 71 is detachably coupled with the coupling device 61. The heavy object 71 is a relatively heavy piece of equipment or device compared to the other pieces of equipment or devices supported by the traveling vehicle body 11. The heavy object 71 includes, for example, a working device 71A (implement), a weight 71B, or a battery assembly 71C. The coupling device 61 is provided to the front side and/or to the rear side of the traveling vehicle body 11, and is operable to connect the heavy object 71 to the traveling vehicle body 11. In the present example embodiment, the coupling device 61 is provided on both the front side and the rear side of the traveling vehicle body 11.

The coupling device 61 includes, for example, a lifting device 63 to support the heavy object 71 to move up or down. By moving the heavy object 71 up or down relatively to the traveling vehicle body 11, the lifting device 63 can modify the relative position of the traveling vehicle body 11 and the heavy object 71. The lifting device 63 can couple, for example, the working device 71A, the weight 71B, or the battery assembly 71C as the heavy object 71 with the traveling vehicle body 11. In the example shown in FIGS. 3 and 4, the lifting device 63 is provided to the rear portion of the traveling vehicle body 11.

Figure 6:
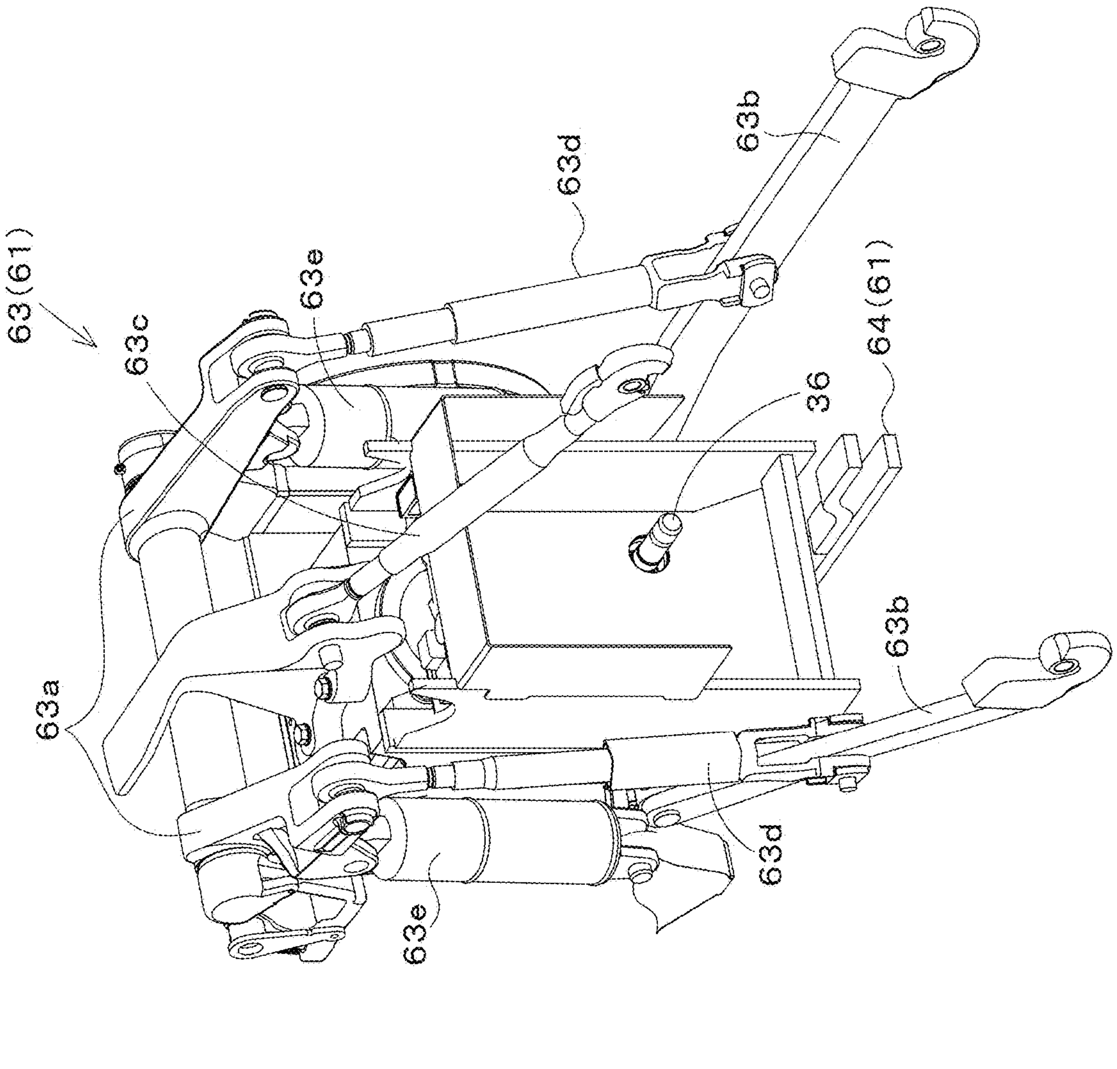
FIG. 6 is a perspective view of a lifting device from the rear.

FIG. 6 is a perspective view of the lifting device 63 from the rear. The lifting device 63 includes lift arms 63*a*, lower links 63*b*, a top link 63*c*, lift rods 63*d*, and lift cylinders 63*e*.

The front-end portion of the lift arms 63*a* is swingably supported upward or downward by the upper rear portion of the traveling vehicle body 11. The lift arms 63*a* swing (move up/down) via the lift cylinders 63*e*. The lift cylinders 63*e* include a hydraulic cylinder. The lift cylinders 63*e* are connected to a hydraulic pump via a lift control valve 63*f*. The lift control valve 63*f* is a solenoid valve and/or the like which modifies an amount of the hydraulic fluid supplied from the hydraulic pump to the lift cylinders 63*e* or the hydraulic fluid discharged from the lift cylinders 63*e*, and causes the lift cylinders 63*e* to extend or retract.

The front-end portion of the lower links 63*b* is swingably supported upward or downward by a bottom rear side of the traveling vehicle body 11. The front-end portion of the top link 63*c* is supported by the rear portion of the traveling vehicle body 11 higher than the lower link 63*b* so as to swing upward or downward. The lift rods 63*d* connect the lift arms 63*a* to the lower links 63*b*. The rear portions of the lower links 63*b* and the rear portion of the top link 63*c* are each hook shaped.

When the lift cylinder 63*e* actuates (expands or retracts), the lower link 63*b* connected to the lift arm 63*a* via the lift rod 63*d* moves up or down with the lift arm 63*a* moving up or down. With this, the heavy object 71 swings upward or downward (moves up or down) around a fulcrum at the front portion of the lower link 63*b*.

The coupling device 61 may include, in addition to or instead of the lifting device 63, a supporting device 64 to support the heavy object 71 such as the working device 71A or the battery assembly 71C and/or the like which cannot be moved up and down. The supporting device 64 includes a swing drawbar and/or the like which connects the working device 71A with the traveling vehicle body 11, and does not modify the relative positions between the working device 71A and the traveling vehicle body 11. The supporting device 64 protrudes rearward from the rear portion of the traveling vehicle body 11. As shown in FIG. 6, the supporting device 64 is provided, for example, at a lower portion of the lifting device 63.

The coupling device 61 may include an attaching device 65, aside from the supporting device 64, to fixedly support the heavy object 71 such as the weight 71B. The attaching device 65 can removably attach one or more of the weights 71B. In the example shown in FIG. 3 and/or the like, the attaching device 65 is provided to the front portion of the traveling vehicle body 11.

Next, the heavy objects 71 will be discussed in detail hereinafter. The working device 71A is a device to perform work and is coupled with the traveling vehicle body 11 via the coupling device 61. The working device 71A may be a cultivator to perform cultivation work, a ridging device to perform ridging, a grooving device to perform grooving, a harvester to harvest crops, a mower to reap herbage and/or the like, a tedder to disperse herbage and/or the like, a rake to collect herbage and/or the like, a baler to shape herbage and/or the like, a fertilizer spreader to spread fertilizer, an agricultural chemical spreader to spread agricultural chemicals, a separator to separate crops, or a carriage and/or the like to carry materials and/or the like.

The weight 71B is coupled with the traveling vehicle body 11 via the coupling device 61, which adjusts the weighted center position of the working vehicle 1 and the weighted center position of the entire working vehicle 1 including the pieces of equipment and/or the like. The weight 71B is, for example, attached to the traveling vehicle body 11, to modify (correct) the weighted center position of the entire working vehicle 1 to an appropriate position when the weighted center position changes with another heavy object 71 connected to the rear of the traveling vehicle body 11.

The battery assembly 71C can supply electric power used to drive the working vehicle 1. For example, the battery assembly 71C includes a second battery 72 (sub-battery, range extender) to supplement the first battery 111 provided in the traveling vehicle body 11. The second battery 72 is rechargeable, including, for example, a secondary battery such as a lithium-ion battery or a lead battery. The second battery 72 includes a plurality of cells therein, and the plurality of cells are electrically connected in series and/or in parallel. In the present example embodiment, the second battery 72 is charged by electric power supplied from an external charger, and supplies the electric power directly or indirectly via the first battery 111, to the electric motor 34.

The battery assembly 71C need only be able to supply electric power used to drive the working vehicle 1, and the second battery 72 may be a rechargeable battery with electric power generated by fuel cell(s). In such a case, the battery assembly 71C includes, in addition to the second battery 72, a tank to store gas (for example, hydrogen gas or methane gas), and fuel cell(s) (fuel cell stack) to generate electricity via the gas supplied from the tank.

The following description refers to a heavy object 71 connected to the front side of the traveling vehicle body 11 via the coupling device 61 as a "first heavy object", and to a heavy object 71 connected to the rear side of the traveling vehicle body 11 via the coupling device 61 as a "second heavy object". The first heavy object is the heavy object 71 located at the front side of the traveling vehicle body 11. The first heavy object in the present example embodiment can be embodied as a weight 71B attached to the attaching device 65 of the front side of the traveling vehicle body 11, a working device 71A (for example, a mower) connected to the lifting device 63 of the rear portion of the traveling vehicle body 11, a weight 71B, a battery assembly 71C and/or the like connected to the lifting device 63 of the rear portion of the traveling vehicle body 11.

The second heavy object is a heavy object 71 located at the rear side of the traveling vehicle body 11. The second heavy object in the present example embodiment can be embodied as a working device 71A (cultivator, ridging device and/or the like), a weight 71B, a battery assembly 71C and/or the like connected to the lifting device 63 of the rear portion of the traveling vehicle body 11 or to the supporting device 64.

In the case where the heavy object 71 is connected, via the coupling device 61, to the traveling vehicle body 11 in contact with the ground while moving with the traveling vehicle body 11, the heavy object 71 is referred to as the "third heavy object". In the case where the heavy object 71 is connected, via the lifting device 63, to the traveling vehicle body 11 not in contact with the ground while traveling, the heavy object 71 is referred to as the "fourth heavy object". That is, the third heavy object is a heavy object 71 to be towed by the traveling vehicle body 11. Specifically, the third heavy object is a heavy object 71 with a relatively massive weight, which cannot be moved up and down via the lifting device 63. The third heavy object can be embodied as a relatively large shaping device (large shaping device), a carriage, or a relatively large battery assembly 71C (large battery assembly) connected to the lifting device 63 or to the supporting device 64. The third heavy object may include a support wheel and to move together as the traveling vehicle body 11 travels.

The fourth heavy object is a heavy object 71 supported and moved up or down by the lifting device 63. The fourth heavy object can be embodied as a working device 71A (cultivator, ridging device and/or the like), a weight 71B, a relatively small battery assembly 71C (small battery assembly) and/or the like connected to the lifting device 63.

In the previously mentioned examples, the coupling device 61 is embodied as the lifting device 63, the supporting device 64 and the attaching device 65, and the heavy object 71 is embodied as the working device 71A, the weight 71B and the battery assembly 71C. Nevertheless, the coupling device 61 and the heavy object 71 are not limited to the previously mentioned examples. For example, the wheels 22 may also use the weight 71B as an attachable/detachable attaching device 65. The heavy object 71 may be a piece of equipment or a device of relatively heavy pieces of equipment or devices, of which weight does not substantially change due to work progress by the working device 71A or as time passes.

For example, in the case where a front loader is attached as the coupling device 61 to the front portion of the traveling vehicle body 11, the heavy object 71 is a working device (attachment) attached to the front loader. In the case where the front loader is detachably attached to the traveling vehicle body 11, it is understood that the coupling device 61 includes an attaching device to attach the front loader to the traveling vehicle body 11, and the heavy object 71 is the front loader.

With reference to mainly to FIG. 1, the pieces of equipment and devices provided in the working vehicle 1 will be discussed in detail hereinafter. As shown in FIG. 1, the working vehicle 1 includes a controller 101. The working vehicle 1 includes a storage device 102.

The controller 101 includes one or more processors. The controller 101 is the controller of the working vehicle 1, and is configured or programmed to perform various controls related to the working vehicle 1. The controller 101 is communicably connected to the devices and the pieces of equipment provided in the working vehicle 1 via an in-car network such as CAN, ISOBUS, LIN, FlexRay and/or the like. An information acquirer 101*a* of the controller 101 is configured or programmed to acquire the state of the devices and pieces of equipment via an in-car network. The information acquirer 101*a* includes electric/electronic circuit(s), CPU(s), and program(s) and/or the like stored in a memory provided in the controller 101. The information acquirer 101*a* can, for example, acquire a State of Charge (SOC) of the first battery 111 or acquire an operation state of the parking brake 52*c* (whether the braking device 51 performs braking) via the in-car network.

The controller 101 may include one or more memories, and various types of analog and/or digital circuits, and/or the like. One or more memories store software program(s) and various pieces of data. The controller 101 is configured or programmed to read software program(s) from one or more memories via one or more processors, and performs various processes based on the software programs. The controller 101 may be configured or programmed to perform various processes based on a predetermined logic circuit via one or more processors.

The processor is, for example, a CPU (Central Processing Unit), a GPU (Graphics Processing Unit), a DSP (Digital Signal Processor), a FPGA (Field Programmable Gate Array), an ASIC (Application Specific Integrated Circuit), and/or the like.

The controller 101 may be configured or programmed to perform various processes with the physically separated plurality of processors collaborating together, and the configuration of the controller 101 is not limited to the previously mentioned one. In such a case, the plurality of processors are respectively provided on one or more computers physically separated from the working vehicle 1, and those processors are communicably connected via a network such as an in-car network, LAN, WAN, and the internet.

The software program(s) are stored in the storage device 102 which is communicably connected to the controller 101 and in an external server connected via the previously mentioned in-car network, and may be configured to be installed in the previously mentioned memory(ies) from the storage device 102 and the external server.

The storage device 102 is a device to store pieces of information. The storage device 102 is a nonvolatile memory such as a HDD, SSD, CD-ROM, DVD-ROM, and/or the like. The storage device 102 is communicably connected to the controller 101. The controller 101 is configured or programmed to control the storage device 102 to store various pieces of information, and retrieves the pieces of information stored in the storage device 102.

As shown in FIG. 1, the working vehicle 1 includes a display 103. The display 103 includes, for example, a display screen 103*a* such as a liquid crystal display. The display 103 is controlled by the controller 101, and displays various information regarding the working vehicle 1. The display 103 is provided at the periphery of the driver seat 12. The display screen 103*a* of the display 103 may include a touch panel.

As shown in FIG. 1, the working vehicle 1 may include a sensor 104. The sensor 104 is communicably connected to the controller 101 via wire or wireless, and outputs the sensing results to the controller 101. The controller 101 can be configured or programmed to detect obstacles around the working vehicle 1 based on the sensing results of the sensor 104, and estimate the position of the working vehicle 1 based on the sensing results (detection point cloud data) and based on the environmental map information stored in the storage device 102 and/or the like. In the following, a position of the working vehicle 1 estimated through the sensing results may be referred to as an “estimated position EP”.

The sensor 104 may include an optical range sensor, and a signal processing circuit and/or the like. The optical range sensor of the sensor 104 may be, for example, embodied as a LiDAR (Light Detection And Ranging).

The LiDAR (laser sensor) radiates pulsatile measurement light (laser light) millions of times per second from a light source such as a laser diode, scans in a horizontal direction or vertical direction and projects light to a predetermined detection area (sensing area, for example 360 degrees) by reflecting the measurement light with a rotative mirror. Then, the LiDAR receives reflected light of the measurement light from the target object with a photoreceptor. The signal processing circuit detects the distance to the target object based on the time between the radiation of measurement light and the reception of reflected light by the LiDAR (ToF (Time of Flight) method).

Note that, other than the LiDAR, the optical range sensor of the sensor 104 can be embodied as an imaging device such as a CCD camera including a CCD (Charge Coupled Devices) image sensor, or a CMOS camera including a CMOS (Complementary Metal Oxide Semiconductor) image sensor, or a ToF camera. While the sensor 104 includes an optical range sensor in the previously mentioned example, a sonic range sensor (for example, an aerial ultrasonic sensor such as sonar) may be used instead of an optical range sensor.

As shown in FIG. 1, the working vehicle 1 may include a positioning device 105. The positioning device 105 is a device to perform positioning of the working vehicle 1 (position detection of the working vehicle 1). The positioning device 105 is communicably connected to the controller 101, and outputs a signal of the estimated position of the working vehicle 1 to the controller 101. The positioning device 105 receives a satellite signal from a satellite positioning system via a GPS antenna and performs positioning of the working vehicle 1 via the satellite signal. The positioning device 105 performs positioning of a predetermined position in the working vehicle 1 which is the position of the working vehicle 1. In the following, the position of the working vehicle 1 estimated by the positioning device 105 may be referred to as the "positioning position PP". In addition to the positioning position PP, the positioning device 105 may detect the orientation of the working vehicle 1 (for example, the orientation the front side of the traveling vehicle body 11 is directed to, the orientation of the vehicle body).

As shown in FIG. 1, the working vehicle 1 may include a posture detector 106. The posture detector 106 is a device to detect the posture of the working vehicle 1 (traveling vehicle body 11). The posture detector 106 is communicably connected to the controller 101, and outputs the detected posture of the traveling vehicle body 11 to the controller 101. Specifically, the posture detector 106 detects a three-dimensional inertial motion of the traveling vehicle body 11 which indicates the posture of the traveling vehicle body 11. The posture detector 106 is, for example, an inertial measurement unit (IMU) including an acceleration sensor, a gyro sensor, and/or the like. The posture detector 106 detects tilting information (roll angle, pitch angle, and yaw angle) and/or the like of the traveling vehicle body 11.

As shown in FIG. 1, the working vehicle 1 includes an input interface E. The input interface E receives an input of pieces of information. The input interface E is communicably connected to the controller 101, and outputs the received input of information to the controller 101.

The input interface E, for example, receives operations from the operator, and outputs information (operation information, operation signal) based on the operations to the controller 101. In such a case, the input interface E includes one or more operation tools to receive operations from the operator, as shown in FIG. 1, for example. The operation tools are hardware type tools such as physical levers or switches, or software type tools such as displayed images which are displayed and operable on the display screen 103*a* of the display 103. The software type operation tools receive operations from the operator operating the touch panel.

As shown in FIG. 1, the controller 101 includes a main controller 101*b*. The main controller 101*b* is configured or programmed to acquire information received from the input via the input interface E, and to control the devices and pieces of equipment included in the working vehicle 1 based on acquired information. The main controller 101*b* may include electric/electronic circuit(s), CPU(s), and program (s) stored in the memory provided in the controller 101 and/or the like. The following discusses a concrete example of the input interface E and of the controls performed by the main controller 101*b* based on received information from the input interface E.

The input interface E receives an input of traveling instructions related to traveling of the traveling device 21. When the input interface E receives an input of traveling instructions, the main controller 101*b* acquires the traveling instructions, and controls traveling via the traveling device 21. Traveling instructions may include operation instructions of the power device 31, for example.

The input interface E which receives operation instructions (traveling instructions) of the power device 31 is an acceleration operation tool 32. The acceleration operation tool 32 receives operations of the power supplied from the power device 31 to the traveling device 21. The acceleration operation tool 32, for example, includes an acceleration pedal, an acceleration lever and/or the like, detects the operations (operation direction, operation amount and/or the like) via a sensor, and outputs the operations as an operation signal to the controller 101.

When the main controller 101*b* acquires the operation signal (traveling instructions, operation instructions) from the acceleration operation tool 32, the main controller 101*b* is configured or programmed to control the power device 31 based on a preset control table, computing equations and/or the like stored in the storage device 102 and on the operation signal. Specifically, the main controller 101*b* is configured or programmed to regulate the rotation number of the electric motors 34 to control the traveling device 21 based on the operation signal from the acceleration operation tool 32.

The main controller 101*b* is configured or programmed to regulate the inverters based on the operation signal from the acceleration operation tool 32, to modify the electric current and the electric voltage supplied to the electric motors 34 as desired. For example, as the operation amount of the acceleration operation tool 32 increases, the main controller 101*b* is configured or programmed to control the electric power supplied to the electric motor 34 to increase the rotation number of the electric motor 34. On the other hand, as the operation amount of the acceleration operation tool 32 decreases, the main controller 101*b* is configured or programmed to control the electric power supplied to the electric motor 34 to decrease the rotation number of the electric motor 34.

Traveling instructions may be operation instructions related to traveling via the traveling device 21, and are not limited to operation instructions of the power device 31. For example, as shown in FIG. 7, in the case where the main controller 101*b* is configured to control the braking device 51, the input interface E may receive an input of operation instructions of the braking device 51 as traveling instructions.

Figure 7:
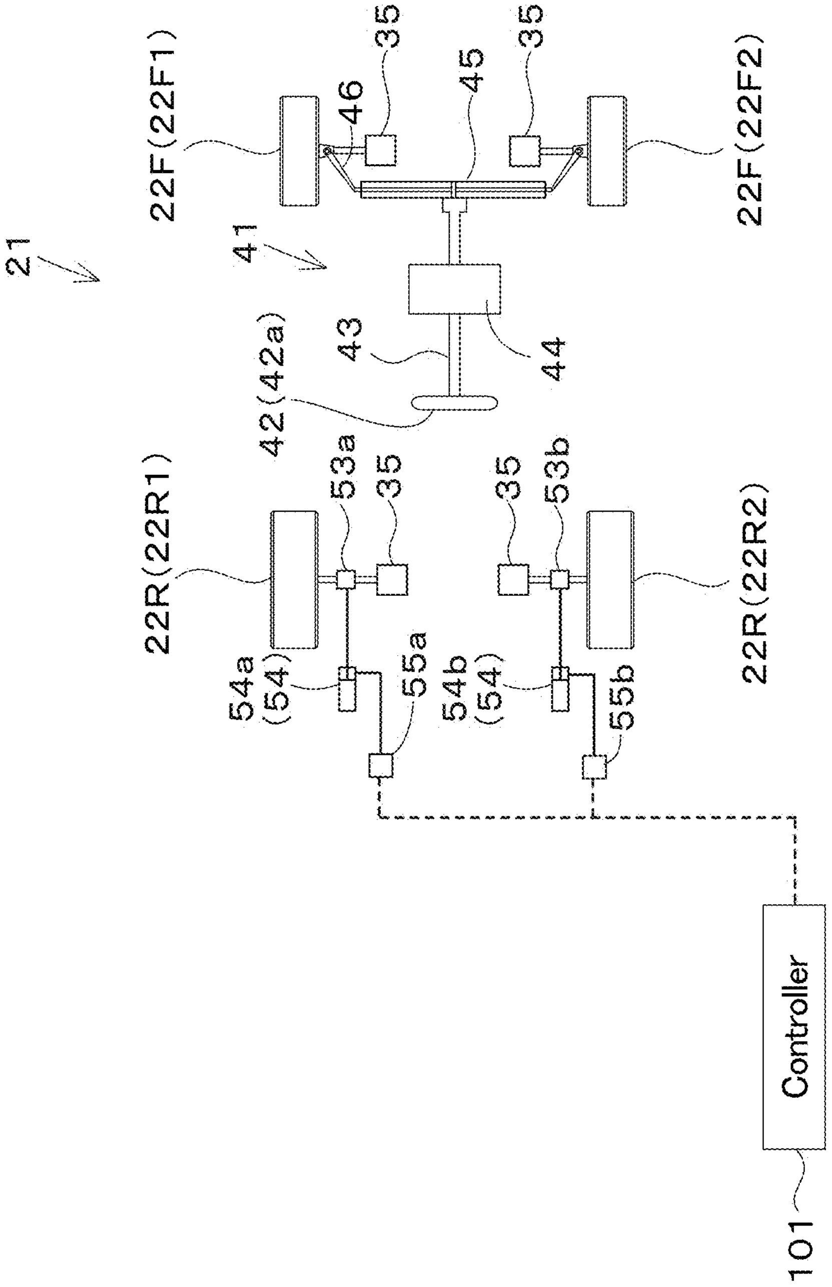
FIG. 7 is a diagram showing another example of devices and pieces of equipment related to traveling via a traveling device.

FIG. 7 shows another example of devices and pieces of equipment related to traveling via the traveling device 21. The braking device 51 shown in FIG. 7 includes hydraulic actuators 54. The hydraulic actuators 54 actuate via hydraulic fluid to operate the braking mechanism 53. The hydraulic actuators 54 include a first hydraulic actuator 54*a* to actuate the first braking mechanism 53*a*, and a second hydraulic actuator 54*b* to actuate the second braking mechanism 53*b*.

A first braking control valve 55*a* is connected to the first hydraulic actuator 54*a* via an oil passage. The first braking control valve 55*a* is, for example, a solenoid valve controlled by the main controller 101*b*, to actuate the first hydraulic actuator 54*a*. On the other hand, a second braking control valve 55*b* is connected to the second hydraulic actuator 54*b* via an oil passage. The second braking control valve 55*b* is, for example, a solenoid valve controlled by the main controller 101*b*, to actuate the first hydraulic actuator 54*a*.

The input interface E receiving operation instructions (traveling instructions) of the braking mechanism 53 is, for example, the braking operation assembly 52. In such a case, the braking operation assembly 52 detects the operations (operation direction and operation amount) of the brake pedals 52*a* and 52*b*, the parking brake 52*c* and/or the like via a sensor, and outputs the detected operations as an operation signal to the controller 101.

When the main controller 101*b* acquires the operation signal (traveling instructions, operation instructions) from the braking operation assembly 52, the main controller 101*b* is configured or programmed to control the braking mechanism 53 based on a preset control table, computing equations and/or the like stored in the storage device 102 and on the operation signal. Specifically, the main controller 101*b* outputs control signals to the braking control valves (first braking control valve 55*a* and/or second braking control valve 55*b*) to control the braking mechanism 53 based on the operation signal from the braking operation assembly 52.

Specifically, as the operation amount of the brake pedals 52*a* and 52*b* increases, the main controller 101*b* is configured or programmed to control to decrease the opening of the braking control valves 55*a* and 55*b* so as to increase the braking force of the braking mechanism 53 via the hydraulic actuators 54. On the other hand, as the operation amount of the brake pedals 52*a* and 52*b* decreases, the main controller 101*b* is configured or programmed to control to increase the opening of the braking control valves 55*a* and 55*b* so as to decrease the braking force of the braking mechanism 53 via the hydraulic actuators 54.

Figure 8:
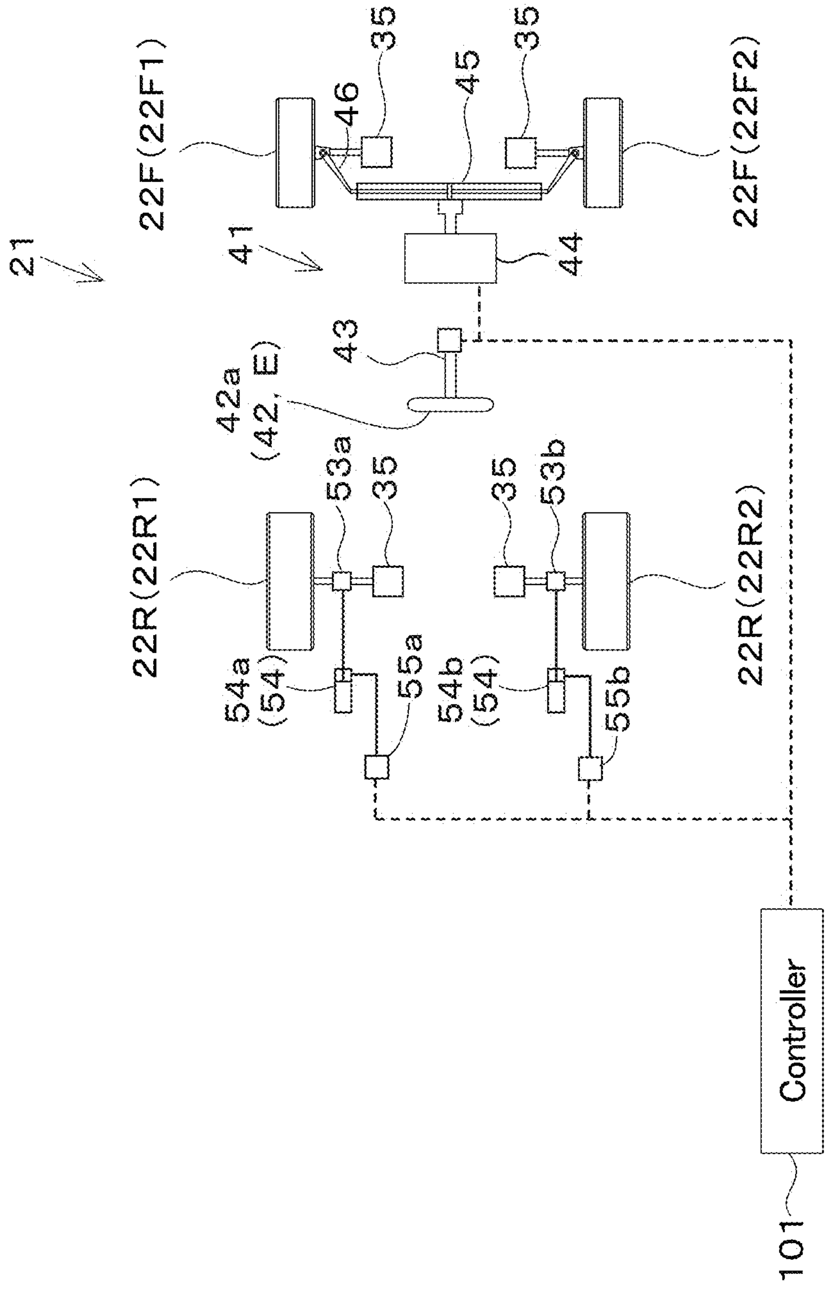
FIG. 8 is a diagram showing another example of devices and pieces of equipment related to traveling via a traveling device.

As shown in FIG. 8, in the case where the main controller 101*b* is configured or programmed to control the steering device 41, the input interface E may receive an input of operation instructions of the steering device 41 as the traveling instructions. FIG. 8 is a diagram showing another example of devices and pieces of equipment related to traveling via a traveling device 21. The steering control valve 44 of the steering device 41 shown in FIG. 8 is a solenoid valve that is controlled by the main controller 101*b* and is not switched based on the steering direction of the steering shaft 43. That is, the steering device 41 has the steering shaft 43 which is not connected to the steering control valve 44, unlike the steering device 41 shown in FIG. 2.

The input interface E to receive operation instructions (traveling instructions) of the steering device 41 is, for example, the steering operation assembly 42. In such a case, the steering operation assembly 42 detects the rotation direction and the rotation angle of the steering handle 42*a* via a sensor, and outputs the operation instructions (operation signals) to the controller 101.

When the main controller 101*b* acquires the operation signals (traveling instructions, operation instructions) from the steering operation assembly 42, the main controller 101*b* is configured or programmed to control the steering of the front wheels 22F based on a preset control table, computing equations and/or the like stored in the storage device 102. Specifically, the main controller 101*b* is configured or programmed to control, based on the operation signals from the steering operation assembly 42, the steering control valve 44 to switch and controls the arms 46 to move along with the extension/retraction of the steering cylinder 45 so as to modify the steering of the front wheels 22F by moving the arms 46 according to the extension/retraction of the steering cylinder 45.

Specifically, as the operation amount of the steering handle 42*a* increases, the main controller 101*b* is configured or programmed to control to increase the opening of the steering control valve 44 to increase the steering angle via the steering cylinder 45. On the other hand, as the operation amount of the steering handle 42*a* decreases, the main controller 101*b* is configured or programmed to control to decrease the opening of the steering control valve 44 so as to decrease the steering angle via the steering cylinder 45.

In addition to, or instead of traveling instructions, the input interface E may receive an input of work instructions related to work performed by the working device 71A. When the input interface E receives an input of work instructions, the main controller 101*b* is configured or programmed to acquire work instructions, and to control the work performed by the working device 71A. Work instructions may include, for example, operation instructions of the lifting device 63.

The input interface E to receive operation instructions (work instructions) of the lifting device 63 is a lifting operation tool 62. The lifting operation tool 62 receives lifting (moving-up) or lowering (moving-down) operations of the lifting device 63. The lifting operation tool 62 including a lifting lever receives an input of lifting/lowering operations (operation direction, operation amount) via a sensor, and outputs the lifting/lowering operations to the controller 101 as an operation signal. The lifting operation tool 62 may include a lifting switch aside from the lifting lever, and may output the operation signal detected by the lifting switch to the controller 101.

When the main controller 101*b* acquires an operation signal (work instructions, operation instructions) from the lifting operation tool 62, the main controller 101*b* is configured or programmed to control the lifting device 63 based on the operation signal, a preset control table, a computing equation and/or the like stored in the storage device 102. Specifically, the main controller 101*b* is configured or programmed to control the lift control valve 63*f* in response to the operation signal of the lifting operation tool 62, to modify the hydraulic fluid delivered to the lift cylinder 63*e* from a hydraulic pump via the lift control valve 63*f* or the hydraulic fluid discharged from the lift cylinder 63*e* via the lift control valve 63*f*.

Work instructions need only be operation instructions related to work performed by the working device 71A, and are not limited to operation instructions of the lifting device 63. For example, the input interface E may receive an input of operation instructions of the rotation number of the PTO shaft 36 as work instructions.

The input interface E to receive operation instructions (work instructions) of the rotation number of the PTO shaft 36 is a rotation operation tool 33. The rotation operation tool 33, for example, includes a dial and/or the like to switch between a plurality of positions, detects operations (position switching) of the dial and/or the like via a sensor, and outputs the detected operations to the controller 101 as an operation signal.

When the main controller 101*b* acquires the operation signal (work instructions, traveling instructions) from the rotation operation tool 33, the main controller 101*b* is configured or programmed to control the fifth electric motor 34*e* to rotate the PTO shaft 36, based on the operation signal, a preset control table, a computing equation and/or the like stored in the storage device 102.

Specifically, the main controller 101*b* is configured or programmed to control the inverters based on the operation signal from the rotation operation tool 33, to modify the electric current and/or the electric voltage supplied to the fifth electric motor 34*e* as desired. For example, as the operation amount of the rotation operation tool 33 increases, the main controller 101*b* increases the electric power supplied to the fifth electric motor 34*e*, to increase the rotation number of the PTO shaft 36. On the other hand, as the operation amount of the rotation operation tool 33 decreases, the main controller 101*b* decreases the electric power supplied to the fifth electric motor 34*e*, to decrease the rotation number of the PTO shaft 36.

The input interface E is not limited to the previously mentioned examples and, in the case where the working vehicle 1 is configured to operate via automatic operation control, the working vehicle 1 may include an operation switch to operate the start and the end of the automatic operation control.

As far as the input interface E receives an input of pieces of information and outputs the received input of pieces of information to the controller 101, any configurations of the input interface E may be used, and the input interface E is not limited to the operation tool to receive operation by the operator. For example, the input interface E may include a communication device 107 to receive the pieces of information sent from a device outside the working vehicle 1. The communication device 107 is a communication interface of the working vehicle 1, and includes a communication circuit. The communication device 107, for example, performs wireless communication with an external server device, a mobile terminal, a remote-controller and/or the like in compliance with IEEE802.11 series communication standards Wi-Fi (Wireless Fidelity, registered trademark), a mobile phone communication network, or a data communication network, and/or the like. The communication device 107 wirelessly communicates with the server device and/or the like, and receives pieces of information, data, signals and/or the like. The communication device 107 may also be used as an output interface configured to output (transmit) pieces of information, data, signals and/or the like to the server device and/or the like.

For example, in the case where the working vehicle 1 is configured to be operated via remote operation control, the communication device 107 receives operation instructions (traveling instructions and/or work instructions) sent from the remote-controller, and outputs the operation instructions to the controller 101 as the operation signal. With this, when acquiring the operation signal (operation instruction), the main controller 101*b* is configured or programmed to control the devices and pieces of equipment based on the operation signal. In the case where the working vehicle 1 is configured to be operated via automatic operation control, the communication device 107 receives operation instructions (traveling instructions and/or work instructions) from a remote controller operating the start and the end and/or the like of the automatic operation control, and outputs the operation instructions as the operation signal to the controller 101. With this, when acquiring operation signals (operation instructions), the main controller 101*b* is configured or programmed to control the start and the end and/or the like of the automatic operation control based on the operation signals.

As shown in FIG. 1, the working vehicle 1 includes an assist device S (assistor). The assist device S performs assistance for at least one of the traveling or the work of the working vehicle 1 based on traveling parameters. The traveling parameters are parameters indicating a relation between the rotation of the traveling device 21 (e.g., the wheels 22) and the traveling distance of the working vehicle 1. Specifically, the traveling parameters indicate the relation between the rotation of the wheels 22 of the traveling device 21 and the traveling distance. The traveling parameters are defined corresponding to the plurality of wheels 22, and defined for each of the wheels 22. In the following, a traveling parameter of the first front wheel 22F1 is referred to as a "first traveling parameter", and a traveling parameter of the second front wheel 22F2 is referred to as a "second traveling parameter". A traveling parameter of the first rear wheel 22R1 is referred to as a "third traveling parameter", and a traveling parameter of the second rear wheel 22R2 is referred to as a "fourth traveling parameter".

The rotation of the wheels 22 in the traveling parameters is, for example, a predetermined rotation number of the wheels 22, or a predetermined rotation angle of the wheels 22. Accordingly, traveling parameters indicate a traveling distance for the rotation (predetermined rotation number or rotation angle) of the wheels 22. The following discusses an example in the case where the traveling parameter indicates the traveling distance for one rotation of the wheel 22.

The traveling parameter is not limited to the traveling distance for the rotation of the wheel 22, and need only indicate the relation between the rotation of the traveling device 21 and the traveling distance. For example, the traveling parameter may be a traveling distance corresponding to a predetermined gear rotation (predetermined rotation number or rotation angle) for either one of an output axle of the electric motor 34 driving the wheels 22 and a power transmission path from the electric motor 34 to the wheels 22.

The traveling parameter is associated with a piece of attachment information of the heavy object 71 coupled with the coupling device 61 and stored in the storage device 102. Thus, as shown in FIG. 9, one or more of the traveling parameters are defined for each of the wheels 22 and stored in the storage device 102 as a table (hereafter referred to as "parameter table") according to one or more pieces of attachment information. In the case where there is a single coupling device 61 included in the working vehicle 1, the traveling parameters are associated with one piece of attachment information and stored in the storage device 102. In the case where a plurality of coupling devices 61 are provided in the working vehicle 1, the traveling parameters are associated with a plurality of pieces of attachment information and stored in the storage device 102.

One or more of the pieces of attachment information are defined for the heavy object 71 currently attached to the coupling device 61. Specifically, one or more of the pieces of attachment information includes information (first piece of attachment information) indicating whether the heavy object 71 is attached to the coupling device 61. In addition to the first piece of attachment information, one or more of the pieces of attachment information may include information indicating types of the heavy object 71 attached to the coupling device 61 (second piece of attachment information). The second piece of attachment information may identify, for example, the type of the heavy object 71 (one of the working device 71A, the weight 71B, the battery assembly 71C, and/or the like) and the name, the model, and unique identification information and/or the like of the heavy object 71.

As shown in FIG. 9, one or more of the pieces of attachment information may include information indicating whether the heavy object 71 attached to the coupling device 61 is a first heavy object or a second heavy object (third piece of attachment information).

In addition, one or more of the pieces of attachment information may include information indicating whether the heavy object 71 attached to the coupling device 61 is a third heavy object or a fourth heavy object (fourth piece of attachment information). The following discusses a case where the parameter table includes the first to fourth pieces of attachment information as the pieces of attachment information to be associated with the traveling parameters and stored.

The traveling parameters need only be associated with the pieces of attachment information including at least one or more of the first to fourth pieces of attachment information and be stored in the storage device 102, and even in the case where the pieces of attachment information include some but not all of the plurality of the first to fourth pieces of attachment information, the combination of the first to fourth pieces of attachment information is not particularly limited. The traveling parameters need at least associate to the pieces of attachment information and be stored in the storage device 102, and may be stored in a associated manner with wheel information for each of the wheels 22 of the traveling device 21 in addition to the pieces of attachment information. Wheel information is information to identify each of the wheels 22 such as types of the wheels 22 (one of a wheel type or a crawler type, and/or the like), names of the wheels 22, models, and unique identification information and/or the like.

The assist device S is configured or programmed to perform support for traveling or work or both based on the traveling parameters stored in the storage device 102. For example, the input interface E receives inputs of the pieces of attachment information, and the information acquirer 101*a* of the controller 101 acquires the pieces of attachment information.

For example, in the case where the input interface E is an operation tool to receive manually operated information from the operator, the operator uses the operation tool to manually input attachment information of the heavy object 71 coupled with the coupling device 61. The information acquirer 101*a* acquires the pieces of attachment information of the heavy object 71 based on the operations to the operation tools.

Figure 10:
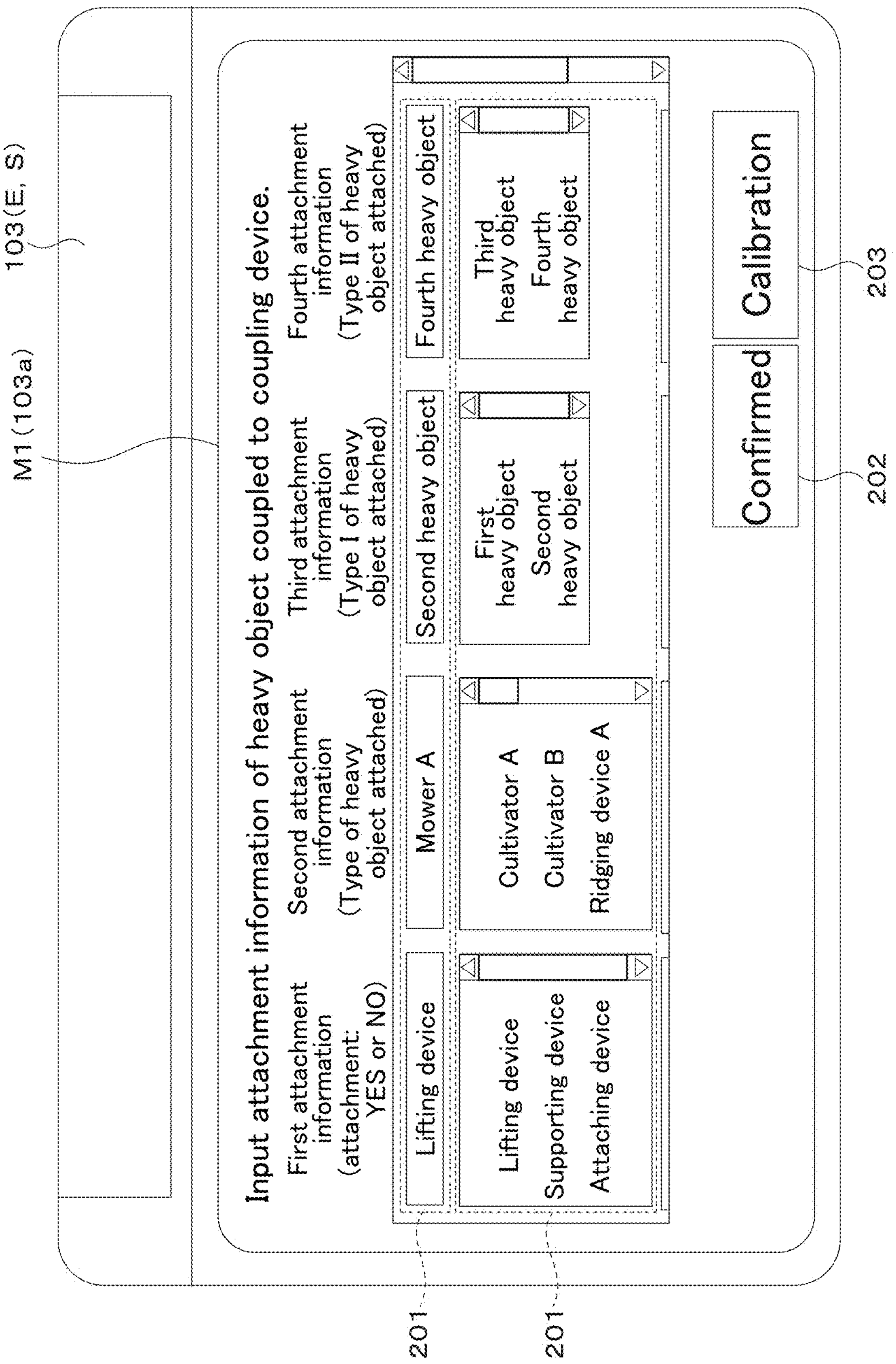
FIG. 10 is a diagram showing an example of a settings screen.

As shown in FIG. 10, when an example is discussed in a case where the display screen 103*a* of the display 103 is configured to display a settings screen M1 to receive an input of pieces of attachment information, the input interface E is a display screen with the settings screen M1 displayed thereon. In such a case, the display 103 displaying the settings screen M1 may be an input interface E to receive an input of pieces of attachment information.

The display 103, for example, displays the settings screen M1 when the working vehicle 1 is activated (for example, when the starter key is operated, and the system of the working vehicle 1 is activated). In the case where one or more of the wheels 22 of the traveling device 21 have been replaced, the display 103 may display the settings screen M1. In the case where the heavy object 71 have been replaced and attached to the coupling device 61, the display 103 may display the settings screen M1. In addition, the display 103 may display the settings screen M1 at an arbitrary point in time when a predetermined operation has been performed, for example.

The settings screen M1 includes one or more information input interfaces 201. The information input interface 201 receives an input of the pieces of attachment information for each of the attachments coupled with the coupling device 61 provided in the traveling vehicle body 11. The information input interface 201 includes input fields, each of which is configured to receive an input of the first to the fourth piece of attachment information respectively. The input fields display a list indicating choices, and the operator selects one of the choices to input one of the first to the fourth pieces of attachment information. While the information input interface 201 receives the inputs of the pieces of attachment information, the information input interface 201 may receive an input of pieces of wheel information in addition to the pieces of attachment information, in the case where the traveling parameters are associated with the pieces of wheel information.

The settings screen M1 includes a confirmation button 202 to confirm the contents of the pieces of attachment information inputted into the information input interface 201. After the operator inputs the pieces of attachment information to the information input interface 201, the operator touches or operates the confirmation button 202 to confirm the inputted pieces of attachment information. When the pieces of attachment information are confirmed, the information acquirer 101*a* acquires the pieces of attachment information that the information input interface 201 has received via input.

The example shown in FIG. 10 discusses a case where the information input interface 201 receives inputs of all the first to fourth pieces of attachment information, and the information acquirer 101*a* acquires the pieces of attachment information inputted into the information input interface 201. Meanwhile, the information input interface 201 may receive only some but not all of the first to fourth pieces of attachment information, and the information acquirer 101*a* may complement or acquire the other piece(s) of attachment information based on a predefined table and/or the like. For example, in the case where the information input interface 201 receives an input of the second piece of attachment information and the traveling parameters corresponding to the second piece of attachment information are stored in the parameter table, the information acquirer 101*a* may acquire the third and fourth pieces of attachment information associated with the traveling parameters, and may skip receiving the inputs of the third and fourth pieces of attachment information via the information input interface 201.

In the case where the second to fourth pieces of attachment information are stored as the table in the storage device 102 or in a server device, the information acquirer 101*a* may acquire, from the table, the third and fourth pieces of attachment information corresponding to the second piece of attachment information received via input by the information input interface 201, and may skip receiving the inputs of the third and fourth pieces of attachment information from the information input interface 201.

Figure 11:
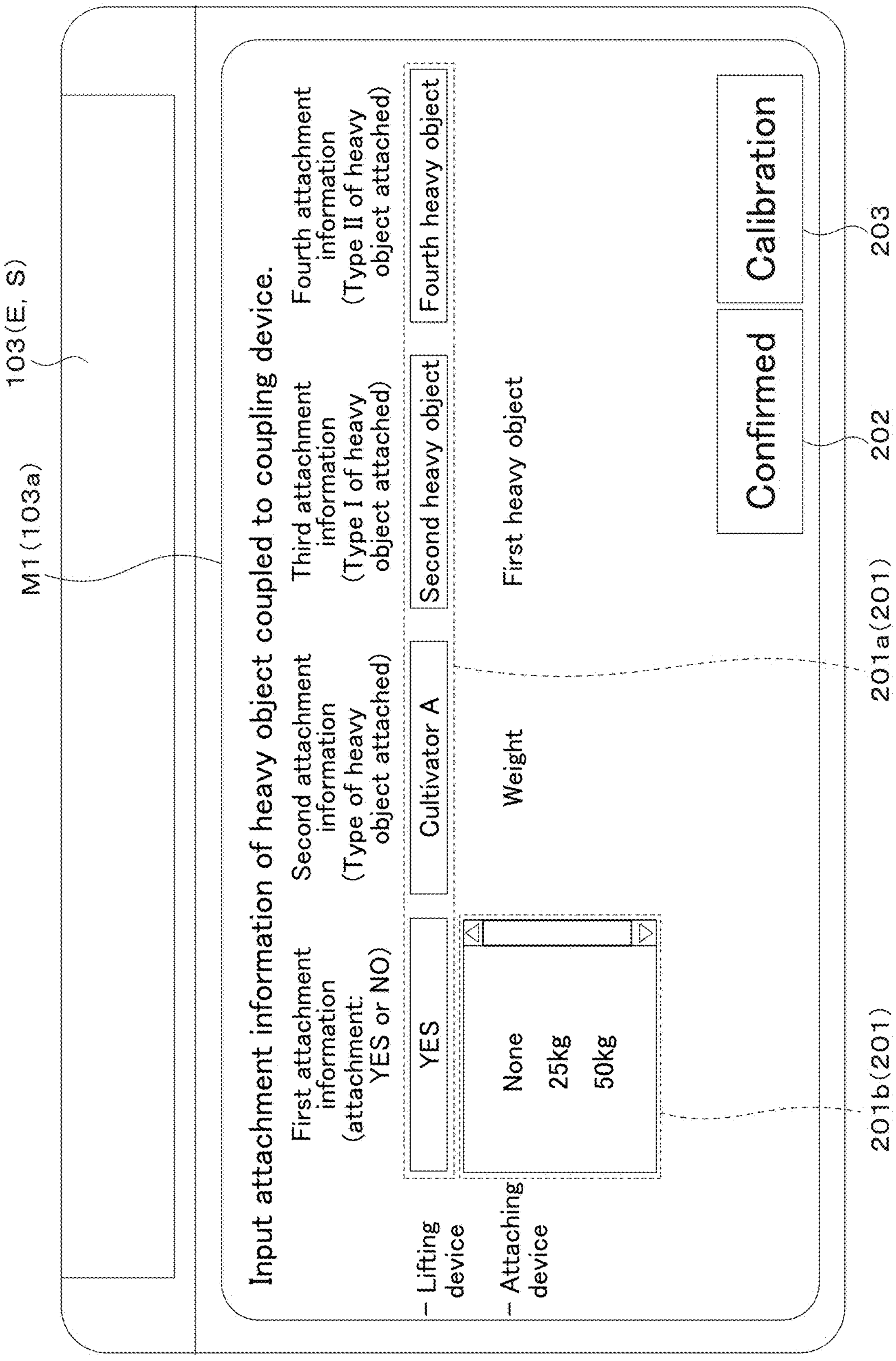
FIG. 11 is a diagram showing another example of a settings screen.

In addition, as shown in FIG. 11, the settings screen M1 may display the information input interface 201 distinguished via the coupling devices 61, and the information input interface 201 may distinguish the pieces of attachment information from the coupling devices 61 and receive inputs. FIG. 11 is a diagram showing another example of a settings screen M1. In the settings screen M1 shown in FIG. 11, the information input interfaces 201 receive the pieces of attachment information other than the third piece of attachment information, and the information acquirer 101*a* acquires, based on the information input interfaces 201 inputted with pieces of attachment information, the third piece of attachment information in addition to the pieces of attachment information received via inputs by the information input interfaces 201.

Specifically, the settings screen M1 shown in FIG. 11 displays, as the information input interfaces 201*a*, first information input interface 201*a* to receive an input of the pieces of attachment information of the heavy object 71 attached to the lifting device 63, and a second information input interface 201*b* to receive an input of the pieces of attachment information of the heavy object 71 attached to the attaching device 65. Thus, in the present example embodiment, the pieces of attachment information (first and second pieces of attachment information) received via input by the first information input interface 201*a* are associated beforehand to the third piece of attachment information indicating that the heavy object 71 attached to the lifting device 63 is the second heavy object, and the pieces of attachment information received via input by the second information input interface 201*b* is associated with the third piece of attachment information indicating that the heavy object 71 attached to the attaching device 65 is the first heavy object.

With this, in the variation shown in FIG. 11, when the information input interfaces 201*a* receive the inputs of the first and second pieces of attachment information, the information acquirer 101*a* can receive the third piece of attachment information in addition to the first and second pieces of attachment information based on the information received via input by the information input interface 201.

For example, when the first information input interface 201*a* receives an input of the attachment of a cultivator to the lifting device 63, the information acquirer 101*a* acquires information indicating that the cultivator has been attached to the rear side of the traveling vehicle body 11 as the first to third pieces of attachment information. When the second information input interface 201*b* receives an input of the attachment of the weight 71B to the attaching device 65, the information acquirer 101*a* acquires information indicating that the weight 71B has been attached to the front side of the traveling vehicle body 11 as the first to third pieces of attachment information.

While the example shown in FIG. 10 discusses a case where the information input interfaces 201 include input fields to receive input of the first to fourth pieces of attachment information, the method of input of the first to fourth pieces of attachment information is not limited to selection from a list of choices. For example, in the variation shown in FIG. 11, the second information input interface 201*b* receives input of the weight of the weight 71B attached to the attaching device 65. With this, the information acquirer 101*a* can acquire the first to third pieces of attachment information.

While the previously mentioned example discusses a case where, the input interface E receiving the inputs of pieces of attachment information is a display image of the settings screen M1 displayed on the display 103, the input interface E is not limited to the previously mentioned example. For example, in the case where the input interface E is a communication device 107, the communication device 107 may receive the piece of attachment information inputted via the settings screen M1 of a mobile terminal possessed by the operator, and the information acquirer 101*a* may acquire the pieces of attachment information. As another example, in the case where an administrator defines beforehand, via an administrator terminal, work details (work planning) to perform on the field, and pieces of attachment information of the heavy object 71 attached to the traveling vehicle body 11 is included in the work planning, the communication device 107 may receive the pieces of attachment information and the information acquirer 101*a* may acquire the pieces of attachment information.

When the heavy objects 71 are provided with a transmitter (for example, a beacon) to transmit identification information unique to the heavy objects 71, the information acquirer 101*a* may identify the heavy object 71 attached to the coupling device 61 based on the identification information received from the beacon by the input interface E (receiver, beacon scanner). In such a case, the storage device 102 or the server device and/or the like is configured or programmed to store the table in which the identification information is associated with the third and fourth pieces of attachment information, and the information acquirer 101*a* is configured or programmed to refer the third and fourth pieces of attachment information corresponding to the identification information received by the beacon, and acquire the first to fourth pieces of attachment information.

When the information acquirer 101*a* acquires the pieces of attachment information received via input by the input interface E, the information acquirer 101*a* stores the pieces of attachment information in a memory and causes the pieces of attachment information to be retained in the memory. The assist device S is configured or programmed to perform assistance for traveling or work or both based on the traveling parameters corresponding to the pieces of attachment information retained in the memory, among the traveling parameters stored in the storage device 102.

The following discusses in detail about definition of the traveling parameters. As shown in FIG. 1, the working vehicle 1 includes the parameter definer 101*c* to define the traveling parameters. In the present example embodiment, the parameter definer 101*c* is provided in the controller 101. The parameter definer 101*c* may include electric/electronic circuit(s), CPU(s), and program(s) and/or the like stored in the memory provided in the controller 101.

The parameter definer 101*c* is configured or programmed to perform the definition process of the traveling parameters. The parameter definer 101*c* is configured or programmed to perform the definition process based on the instruction (definition instruction) received via input by the input interface E. When the input interface E receives an input of the definition instruction, the parameter definer 101*c* shifts from a standby mode not performing the definition process to a mode (definition mode, calibration mode) performing the definition process. For example, in the case where the parking brake 52*c* is operated and the braking mechanism 53 performs braking, when the settings screen M1 receives the predetermined operation such as an operation of the shift button 203 included thereon, the parameter definer 101*c* shifts to the calibration mode.

The conditions for the parameter definer 101*c* to shift to calibration mode are not limited to the previously mentioned example. In another example where the traveling parameters corresponding to the pieces of attachment information retained in the memory are not stored in the storage device 102, the parameter definer 101*c* may shift from standby mode to calibration mode automatically or via verification operation of the operator.

The parameter definer 101*c* performs a definition process which includes defining traveling parameters based on an actual traveling state of the traveling device 21, and also associating and storing in the storage device 102, the traveling parameters and attachment information of the heavy object 71 attached to the coupling device 61. The actual traveling state of the traveling device 21 is, for example, the traveling state when the traveling vehicle 11 actually traveled on an even ground or an equipment (chassis dynamometer and/or the like) appropriate for acquiring the traveling state that the parameter definer 101*c* uses for the definition process.

More specifically, the actual traveling state of the traveling device 21 is, for example, the traveling state when the traveling vehicle body 11 traveled a reference distance D via the traveling device 21. In the following, traveling the reference distance D of the traveling vehicle body 11, which is used for the parameter definer 101*c* to acquire the traveling state in the definition process, is referred to as "calibration traveling". The controller 101 may be configured or programmed to limit the traveling speed (vehicle speed) of the working vehicle 1, which is a preset speed during the calibration traveling. In so doing, the controller 101 is configured or programmed to calculate a vehicle speed based on the vehicle position VP such as the estimated position EP or the positioning position PP, and limit the vehicle speed to the preset speed (for example, 1 km/h) based on the vehicle speed by controlling the electric motor 34. The preset speed may be modified based on information received via input by the input interface E.

In the present example embodiment, the description focuses on the case where the calibration traveling is performed by the operator via manual operation, but the controller 101 may be configured or programmed to automatically control the steering device 41 with automatic steering control, and may be configured or programmed to automatically control the steering device 41 and the traveling device 21 with automatic operation control. The controller 101 performing automatic steering control or automatic operation control is configured or programmed to control the steering device 41 so that the vehicle position VP of the estimated position EP or of the positioning position PP follows an imaginary straight traveling line.

The parameter definer 101*c* is configured or programmed to acquire, for example, the rotation of the traveling device 21 as the actual traveling state of the traveling device 21. As shown in FIG. 1, the controller 101 is configured or programmed to include a rotation calculator 101*d* to calculate the rotation of the traveling device 21. The parameter definer 101*c* is configured or programmed to acquire the rotation of the traveling device 21 calculated by the rotation calculator 101*d*. The rotation calculator 101*d* includes electric/electronic circuit(s), CPU(s), and program(s) and/or the like stored in the memory provided in the controller 101.

As shown in FIG. 1, the working vehicle 1 includes one or more rotation detectors 108. The rotation detector 108 is communicably connected to the controller 101, and outputs detection results thereto. The rotation calculator 101*d* calculates a rotation number and/or a rotation angle of the traveling device 21 per a determined time period which is the rotation of the traveling device 21, based on the detection results outputted from the rotation detector 108.

The rotation detector 108 detects the rotation of the traveling device 21. The rotation detector 108 is, for example, an optical or magnetic rotation sensor. For example, the rotation detector 108 detects the rotation of the traveling device 21 as a pulse signal, and outputs the pulse signal to the controller 101. In the present example embodiment, the rotation detector 108 is provided on the output axle of the electric motors 34. The rotation calculator 101*d* acquires the rotation of the output axle for each of the electric motors 34 based on the detection results outputted from the rotation detector 108, and converts the rotation of the output axle for each of the electric motors 34 into the rotation of the wheels 22 based on predetermined computing equation(s) and/or the like stored in the storage device 102. Thus, the rotation calculator 101*d* can independently calculate the rotation of the wheels 22 based on the detection results outputted from the rotation detector 108. With this, the parameter definer 101*c* acquires the traveling state based on the rotational driving force generated by the electric motor 34, and performs the definition process based on the traveling state.

The rotation detector 108 need only be able to detect information (rotation) necessary for the rotation calculator 101*d* to calculate the rotation of the traveling device 21, and may detect the rotation of the axle of the wheels 22 or a predetermined rotation of a gear of the power transmission route from the electric motor 34 to the wheels 22 driving the wheels 22. For example, in the case where the rotation detector 108 detects a predetermined rotation of the gear of the power transmission route, the rotation calculator 101*d* converts the rotation of the gear into the rotation of the wheels 22 based on predetermined computing equation(s) and/or the like stored in the storage device 102.

In the present example embodiment, the rotation calculator 101*d* calculates the rotation number of the wheels 22 per a determined time period as the rotation of the traveling device 21, based on the detection results outputted from the rotation detector 108. With this, the rotation calculator 101*d* can calculate the rotation number of the wheel 22 from a predetermined start point in time (start time) to an end point in time (end time). For example, the rotation calculator 101*d* acquires a traveling distance from the start of the calibration traveling based on the determined position (positioning position PP) of the working vehicle 1, and calculates the rotation of the traveling device 21 during a period (hereafter referred to as the calibration period) from the start (start point in time) of the calibration traveling to a point in time (end point in time) when the reference distance D has been traveled.

The rotation calculator 101*d* need only be able to calculate the traveling state when the traveling vehicle body 11 has traveled the reference distance D via the traveling device 21, and may acquire the traveling distance since the calibration traveling started based on information other than the positioning position PP. For example, in the case where the sensor 104 is provided on the working vehicle 1 and where the estimated position EP can be estimated based on the sensing results of the sensor 104, the rotation calculator 101*d* may acquire the traveling distance since the calibration traveling started, based on the estimated position EP.

In the case where the traveling vehicle body 11 performs the calibration traveling with equipment such as a chassis dynamometer, the equipment calculates the traveling distance during the calibration traveling based on the rotation of rollers of the equipment and/or the like rotated by the wheels 22. The rotation calculator 101*d* may calculate the rotation of the traveling device 21 during the calibration period, based on the traveling distance calculated with the above-mentioned equipment.

From the description above, the parameter definer 101*c* can acquire the rotation number of each of the wheels 22 during the calibration period calculated by the rotation calculator 101*d*. With this, the parameter definer 101*c* calculates (defines) the traveling parameters of the wheels 22 by dividing the reference distance D by the aforementioned rotation number. The parameter definer 101*c* acquires pieces of attachment information retained in a memory during the calibration traveling (calibration period), associates the traveling parameters defined based on the traveling state during the calibration traveling with one of the pieces of attachment information, and store the traveling parameters and the pieces of attachment information in associated manner.

The definition (calculation) of the traveling parameters is described above with the case where the traveling parameters indicate the relation between the rotation number of the wheels 22 and the traveling distance as an example, but when the traveling parameters indicate the relation between another rotation of the traveling device 21 and the traveling distance, the parameter definer 101*c* calculates the traveling parameters with a computing equation(s) different from the computing equation(s) described above. For example, in the case where the traveling parameters indicate the relation between the traveling distance and the rotation numbers of the output axles of the electric motors 34 that drive the wheels 22, the parameter definer 101*c* calculates the traveling parameters of the wheels 22 by dividing the reference distance D by the rotation number of the output axles of the electric motors 34 (first electric motor 34*a*, second electric motor 34*b*, third electric motor 34*c*, fourth electric motor 34*d*).

In addition, the above example describes that the traveling vehicle body 11 travels the reference distance D during the calibration traveling, but the traveling vehicle body 11 may travel based on reference rotation (number of revolutions or angle of rotation) of the traveling device 21 rather than the reference distance D in order for the parameter definer 101*c* to acquire the traveling state used in the definition process. In such a case, the parameter definer 101*c* calculates (defines) the traveling parameters for each of the wheels 22 by dividing the traveling distance during the calibration traveling by the reference rotation number of each of the wheels 22.

The parameter definer 101*c* may perform the definition process in the case where predetermined process conditions are fulfilled, and may not perform the definition process in the case where predetermined process conditions are not fulfilled. The parameter definer 101*c* need only control the storage device 102 to store at least the defined traveling parameters in the case where the process conditions are not fulfilled, and may perform a portion of the definition process.

The process conditions include, for example, at least one of a condition at start time of the calibration traveling (start condition) and a condition during the calibration traveling (traveling condition). First, the start condition will be discussed. When shifting to calibration mode, the parameter definer 101*c* determines whether the start condition is fulfilled.

For example, the parameter definer 101*c* determines whether to perform the definition process based on a surrounding environment of the traveling vehicle body 11 (first start condition). The parameter definer 101*c* determines whether the surrounding environment of the start point of the calibration traveling is appropriate, and does not perform the definition process as not fulfilling the first start condition when the surrounding environment is not appropriate. The parameter definer 101*c* determines whether the surrounding environment is appropriate, for example, based on the sensing results of the sensor 104.

Specifically, when the parameter definer 101*c* determines that an obstacle is present in the traveling direction (front) of the traveling vehicle body 11 from the sensing results of the sensor 104, the parameter definer 101*c* determines the surrounding environment as not appropriate. For example, when determining that an obstacle is present at the front side of the traveling vehicle body 11 within the reference distance D, the parameter definer 101*c* determines the surrounding environment as not appropriate.

When the parameter definer 101*c* determines that the unevenness of the road surface in the traveling direction (front) of the traveling vehicle body 11 is relatively important from the sensing results of the sensor 104, the parameter definer 101*c* may determine the surrounding environment as being not appropriate. For example, when the parameter definer 101*c* determines that the ground at the front side of the traveling vehicle body 11 within the reference distance D is a relatively rough terrain, the parameter definer 101*c* determines the surrounding environment as being not appropriate.

The parameter definer 101*c* may determine whether the surrounding environment is appropriate based on the detection results of the posture detector 106. Specifically, when the parameter definer 101*c* determines from the detection results of the posture detector 106, that at least one of the roll angle and the pitch angle of the traveling vehicle body 11 is equal to or more than a predetermined value, the parameter definer 101*c* determines the surrounding environment as not appropriate. For example, when the parameter definer 101*c* determines that at least one of the roll angle and pitch angle is outside of a predetermined scope, the parameter definer 101*c* determines the surrounding environment as being not appropriate. In the case where at least one of the roll angle and the pitch angle falls outside of a scope by about ±2 degrees relative to the horizon, for example, the parameter definer 101*c* determines the surrounding environment as being not appropriate.

The scope within which the parameter definer 101*c* determines the surrounding environment as being not appropriate is not limited to about ±2 degrees relative to the horizon and may be, for example, about ±5 degrees relative to the horizon. The scope may be modified as required with data received via input by the input interface E.

In the case where at least the surrounding environment is not appropriate, the parameter definer 101*c* should not perform the definition process, and the manner for determining whether the surrounding environment is appropriate is not limited to the aforementioned examples. For example, when the storage device 102 stores map information beforehand including a terrain condition (inclination, unevenness of the ground, and/or the like), the parameter definer 101*c* may determine whether the surrounding environment of the traveling vehicle body 11 is appropriate for the parameter definer 101*c* to perform the definition process, based on the vehicle position VP (positioning position PP or estimated position EP) and the map information.

The parameter definer 101*c* may determine whether to perform the definition process based on a vehicle state of the traveling vehicle body 11 (second start condition). The parameter definer 101*c* determines at start time of the calibration traveling whether the vehicle state is appropriate, and does not perform the definition process as not fulfilling the second start condition when the surrounding environment is not appropriate. The parameter definer 101*c* acquires the state of the devices and pieces of equipment provided in the traveling vehicle body 11 which is the vehicle state of the traveling vehicle body 11, and determines whether the vehicle state is appropriate. For example, the parameter definer 101*c* determines whether the vehicle state is appropriate based on whether acquisition of a signal via an in-car network from the electric motor 34, the sensor 104, the positioning device 105 and the posture detector 106 and/or the like is possible. Specifically, in the case where acquisition of a signal from the devices and pieces of equipment is not possible, the parameter definer 101*c* determines the vehicle state as being not appropriate. In so doing, the parameter definer 101*c* may output a signal for anomaly determination (check signal) via an in-car network to the devices and pieces of equipment, may acquire the state of the devices and pieces of equipment based on a response to the check signal, and may determine whether the vehicle state is appropriate.

The parameter definer 101*c* need only be able to determine whether the vehicle state is appropriate, and conditions regarding whether the state of the devices and pieces of equipment acquired is appropriate are not limited to the aforementioned examples. For example, the parameter definer 101*c* acquires the state of the electric motor 34, the first battery 111, the sensor 104, the positioning device 105 and the posture detector 106 and/or the like, as the vehicle state.

The parameter definer 101*c* acquires, for example, the vibration, the temperature and/or the like of the electric motor 34 as the state of the electric motor 34 and determines the vehicle state as being not appropriate in the case where the vibration is abnormal or in the case where the temperature is greater than a predetermined value.

The parameter definer 101*c* acquires the remaining capacity and the temperature of the first battery 111 as the state of the first battery 111 and determines the vehicle state as being not appropriate in the case where the state of charge (SoC) is lower than a predetermined value or in the case where the temperature is greater than a predetermined value.

The parameter definer 101*c* acquires sensing results of the sensor 104 as the state of the sensor 104 and determines the vehicle state as being not appropriate in the case where the sensing results are abnormal (for example, in the case where the detected point cloud data included in the sensing results is unusually scarce).

The parameter definer 101*c* acquires a signal reception strength of radio waves received by the positioning device 105 from a plurality of positioning satellites as the state of the positioning device 105, and determines the vehicle state as being not appropriate in the case where the number of the positioning satellites is lower than a predetermined number, of which signal reception strength is equal to or higher than a predetermined value.

The parameter definer 101*c* acquires detection results of the posture detector 106 which is the state of the posture detector 106, and determines the vehicle state as being not appropriate in the case where the detection results are abnormal (for example, in the case where the roll angle and/or the pitch angle is unusually large).

The aforementioned start conditions are examples and not limited thereto. For example, the parameter definer 101*c* may determine whether to perform the definition process based on the steering angle of the traveling vehicle body 11 (third start condition), in the case where a steering detector is provided to detect a rotation direction and a rotation angle of the steering shaft 43, or in the case where the steering device 41 is provided with the steering operation assembly 42 including a sensor to detect the rotation direction and the rotation angle of the steering handle 42*a* as shown in FIG. 8. The parameter definer 101*c* determines, at the start point of the calibration traveling, whether the steering angle is within a predetermined range from the point where the rotation angle of the steering shaft 43 is zero (steering angle is zero) which is appropriate, and does not perform the definition process as the third start condition is not fulfilled at least in the case where the steering angle is not appropriate.

Figure 12:
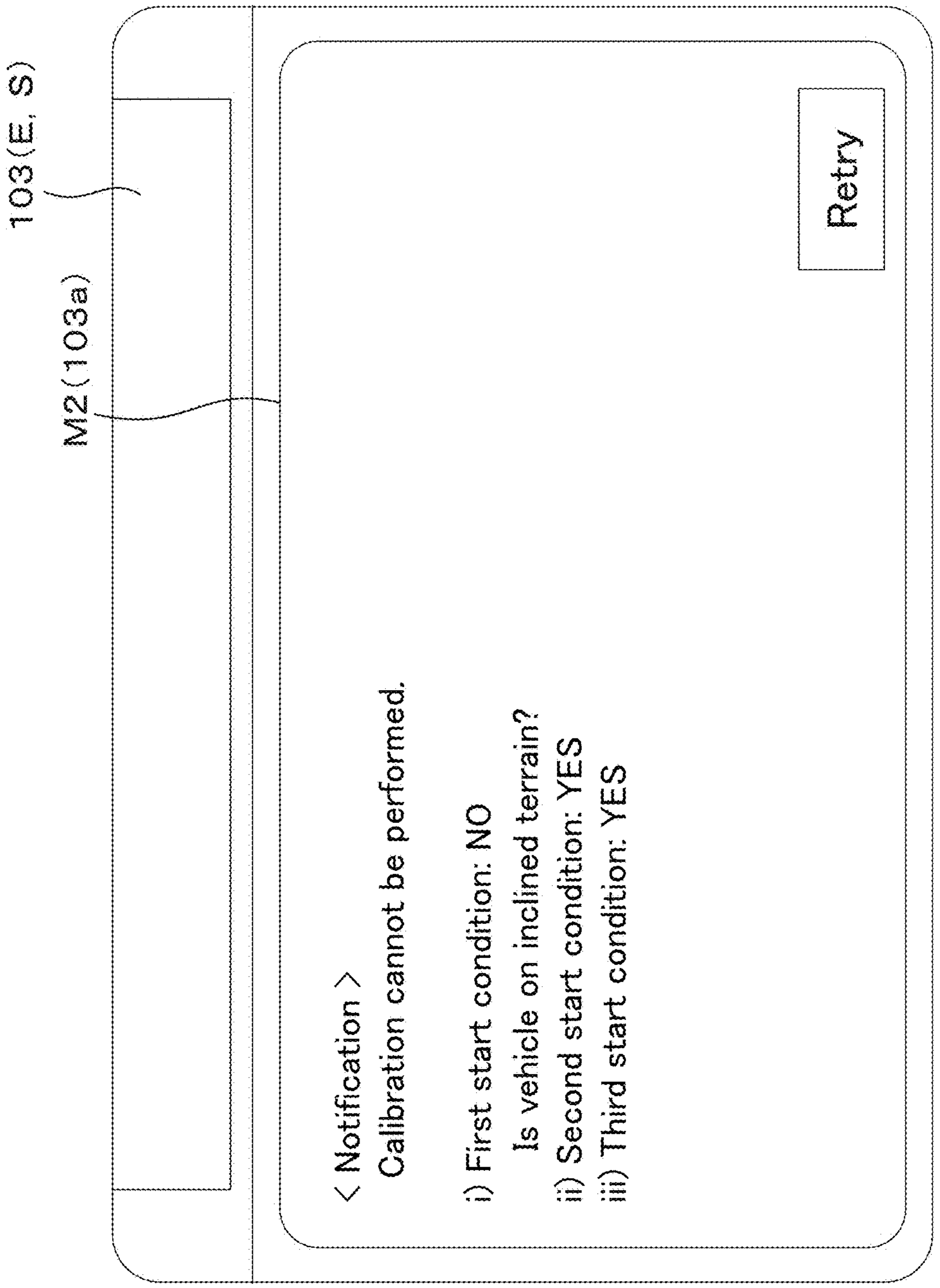
FIG. 12 is a diagram showing an example of a first notification screen.

In the case where the parameter definer 101*c* determines that the start conditions (first start condition or second start condition and/or the like) are not fulfilled, the display 103 notifies that the definition process will not be performed, and that new traveling parameters will not be defined. Specifically, in the case where the parameter definer 101*c* determines that the start conditions are not fulfilled, the controller 101 is configured or programmed to control the display 103 to display a first notification screen M2 (see FIG. 12) on the display screen 103*a* of the display 103. As shown in FIG. 12, the first notification screen M2 displays a message indicating "Calibration cannot be performed". In so doing, the first notification screen M2 may display the start conditions which are not fulfilled at the start point of the calibration traveling, and/or the start conditions fulfilled. In the case where the parameter definer 101*c* determines that start conditions are not fulfilled, the parameter definer 101*c* may automatically shift from calibration mode to standby mode.

Figure 13:
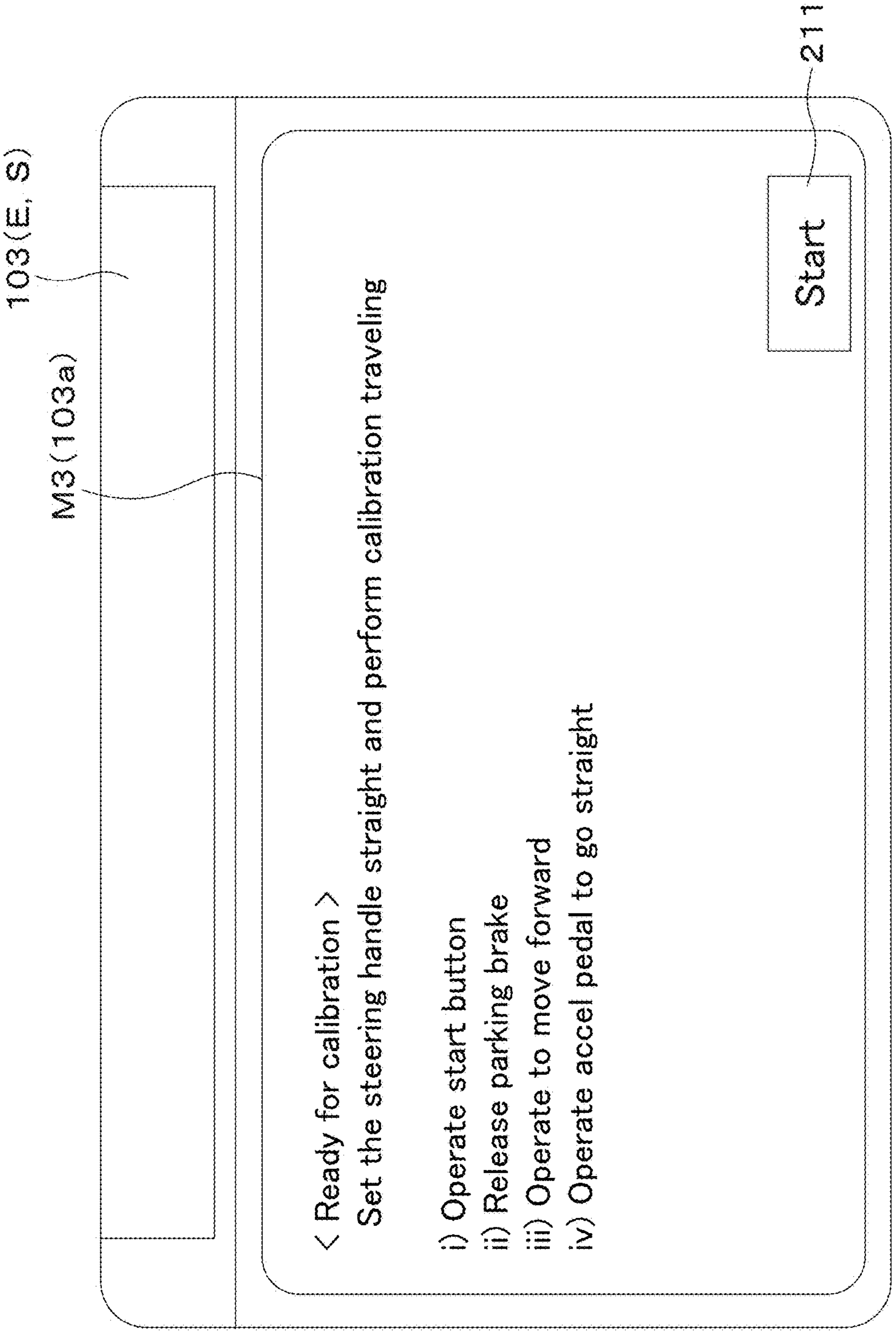
FIG. 13 is a diagram showing an example of a second notification screen.

In the case where the parameter definer 101*c* determines that start conditions (first start condition or second start condition and/or the like) are fulfilled, the display 103 notifies to instruct to perform the definition process. Specifically, in the case where the parameter definer 101*c* determines that start conditions are fulfilled, the controller 101 is configured or programmed to control the display 103 to display a second notification screen M3 (see FIG. 13) on the display screen 103*a* of the display 103. As shown in FIG. 13, the second notification screen M3 displays a message indicating "Set the steering handle straight and perform calibration traveling". The second notification screen M3 includes a start button 211, and the calibration traveling may be configured to start when the start button 211 is operated.

The traveling conditions will now be discussed herein. The parameter definer 101*c* may acquire behavioral information regarding a behavior of the traveling vehicle body 11 corresponding to the traveling state, and may determine whether to perform the definition process with the behavioral information based on the traveling state (first traveling condition). In the case where the parameter definer 101*c* determines whether the traveling vehicle body 11 traveled on rough terrain based on the behavioral information and in the case where the traveling vehicle body 11 traveled on rough terrain, the parameter definer 101*c* does not perform the definition process based on the traveling state as the first traveling condition is not fulfilled.

For example, the parameter definer 101*c* acquires the detection results of the posture detector 106 during the calibration period as the behavioral information, and determines whether the traveling vehicle body 11 has traveled on rough terrain. Specifically, the parameter definer 101*c* acquires the acceleration of the posture (at least one of a roll angle and a pitch angle) of the traveling vehicle body 11 via the detection results of the posture detector 106. The parameter definer 101*c* determines whether the traveling vehicle body 11 traveled on rough terrain based on the magnitude of the acceleration during the calibration period.

In so doing, the parameter definer 101*c* determines whether the traveling vehicle body 11 traveled on rough terrain based on at least one of the positive acceleration (acceleration which is equal to or more than zero) and the negative acceleration (acceleration which is lower than zero) of the accelerations during the calibration period. The following discusses an example in the case where the parameter definer 101*c* determines whether the traveling vehicle body 11 has traveled on rough terrain based on the negative acceleration during the calibration period.

Figure 14A:
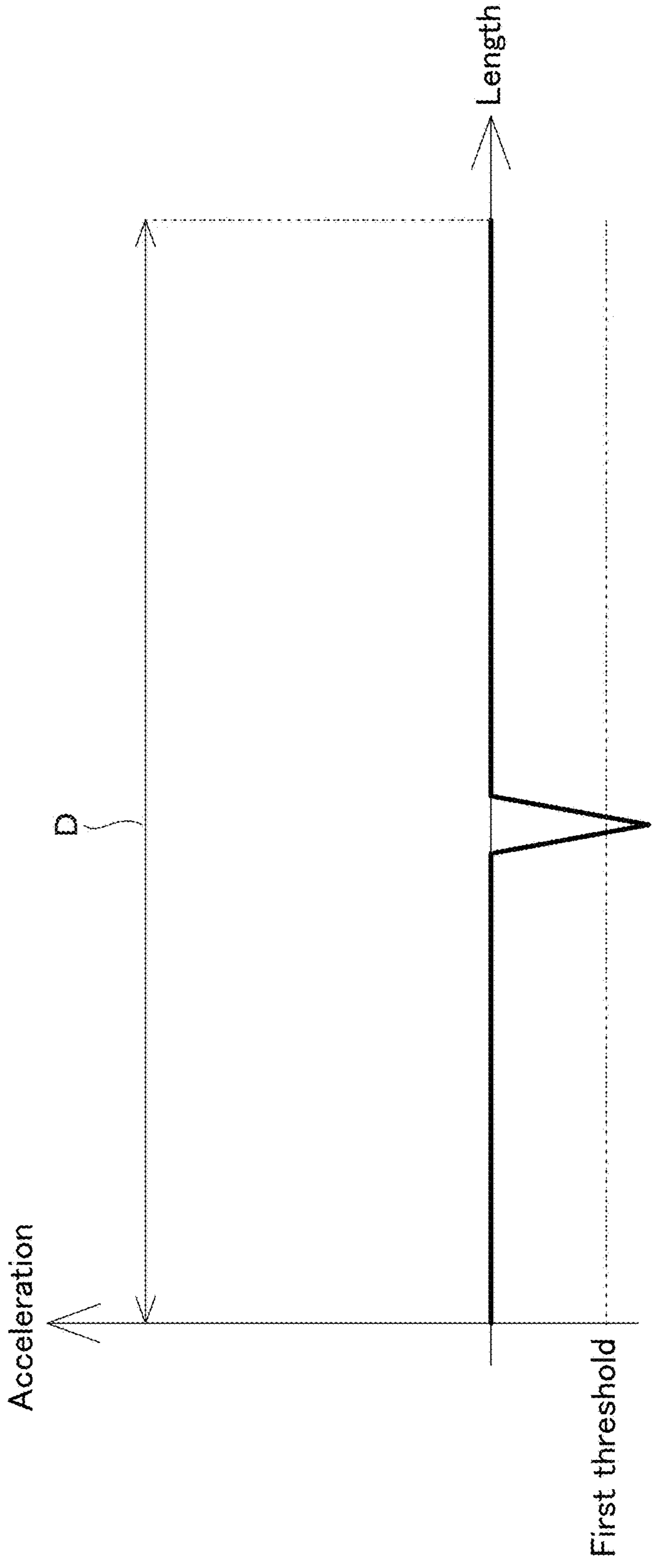
FIG. 14A is a diagram showing an example of a change of the acceleration of the posture of a traveling vehicle body traveling on rough terrain.

In the present example embodiment, the parameter definer 101*c* acquires the acceleration of the roll angle during the calibration period and determines whether the traveling vehicle body 11 has traveled on rough terrain. For example, in the case where the acceleration of the posture of the traveling vehicle body 11 has become equal to or lower than a predetermined threshold value (first threshold value) during the calibration period, the parameter definer 101*c* determines that the traveling vehicle body 11 has traveled on rough terrain (see FIG. 14A). The parameter definer 101*c* estimates that the traveling vehicle body 11 has traveled on terrain with a relatively important unevenness and determines that the traveling vehicle body 11 has traveled on rough terrain.

Figure 14B:
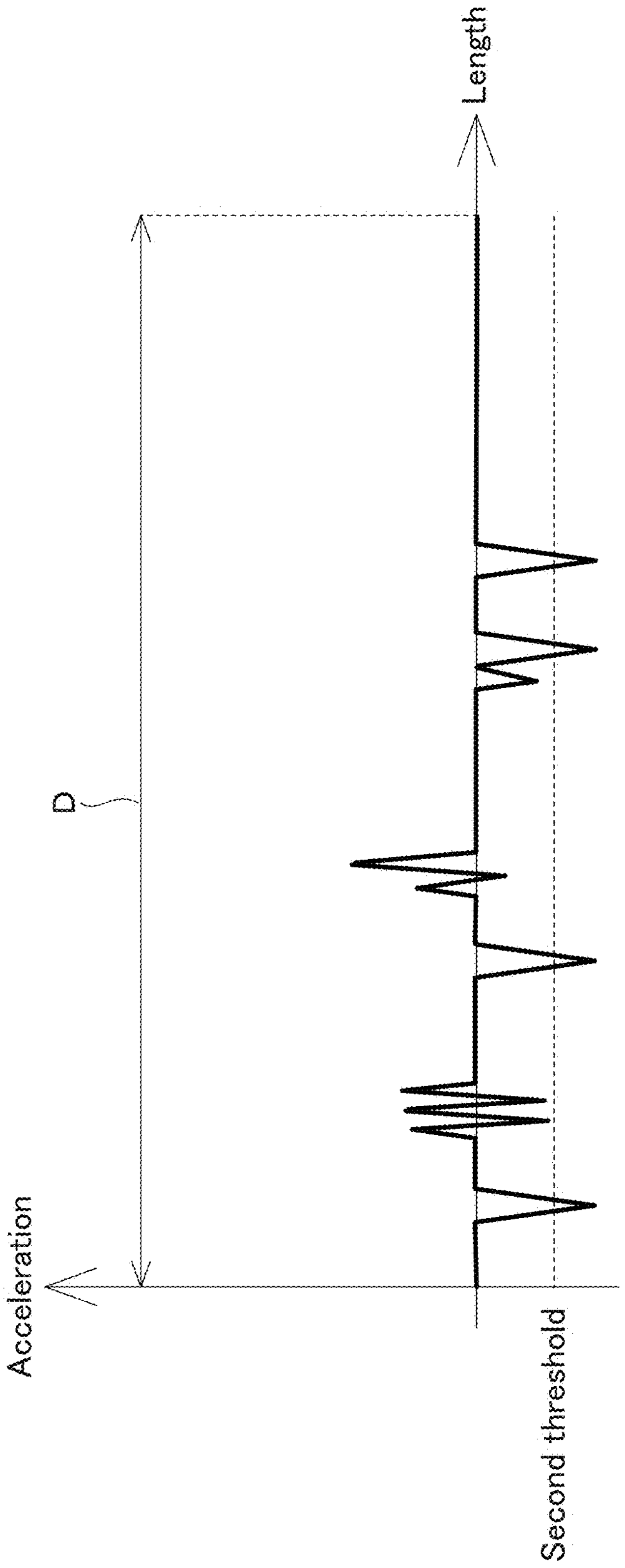
FIG. 14B is a diagram showing another example of a change of the acceleration of the posture of a traveling vehicle body traveling on rough terrain.

In the case where the acceleration of the posture of the traveling vehicle body 11 has become equal to or lower than a predetermined threshold value (second threshold value) during the calibration period for a number of times equal to or higher than predetermined, the parameter definer 101*c* may determine that the traveling vehicle body 11 has traveled on rough terrain (see FIG. 14B). The second threshold value is a value larger than the first threshold value. In so doing, the parameter definer 101*c* estimates that the traveling vehicle body 11 has traveled on terrain with a plurality of relatively small uneven spots thereon, and determines that the traveling vehicle body 11 has traveled on rough terrain.

Figure 14C:
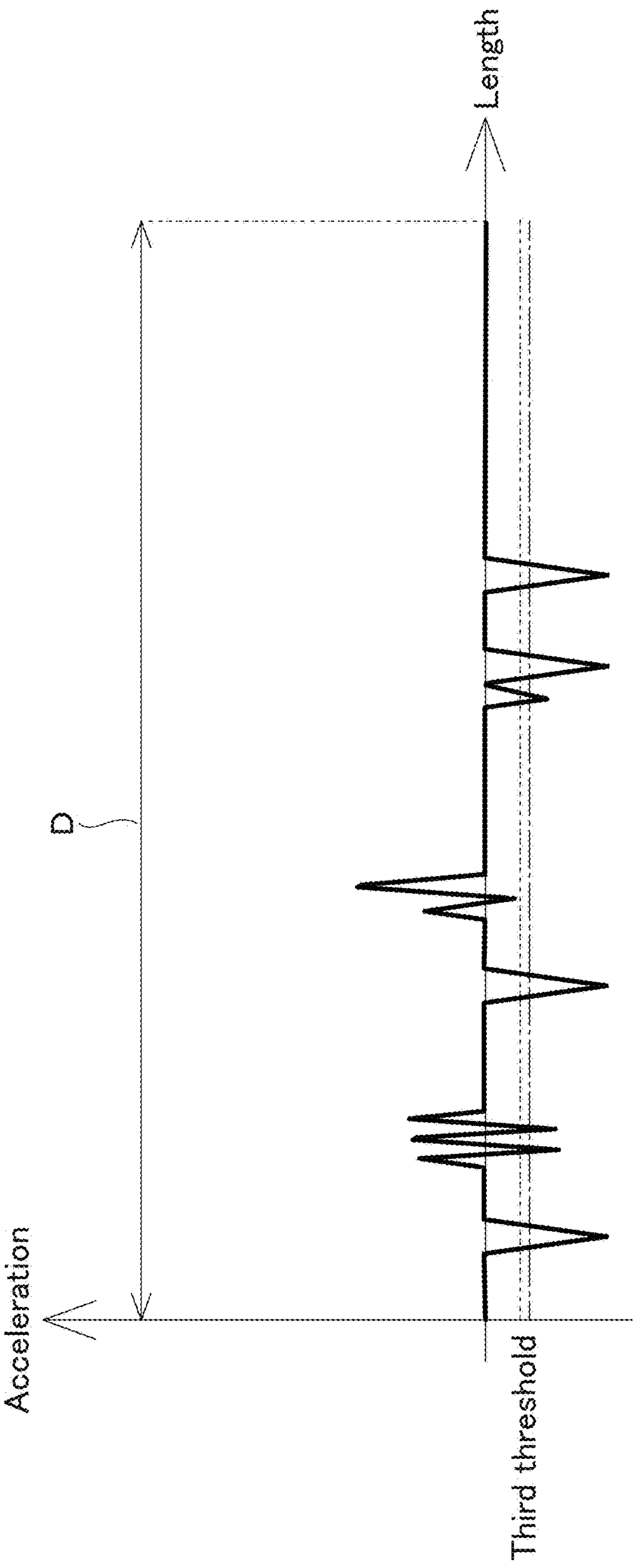
FIG. 14C is a diagram showing another example of a change of the acceleration of the posture of a traveling vehicle body traveling on rough terrain.

In the case where an average value of the accelerations of the posture of the traveling vehicle body 11 during the calibration period is equal to or lower than a predetermined threshold value (third threshold value), the parameter definer 101*c* may determine whether the traveling vehicle body 11 has traveled on rough terrain (see FIG. 14C). The average value of the accelerations of the posture of the traveling vehicle body 11 is an average value of accelerations lower than zero. In FIG. 14C, the average value of the accelerations of the posture of the traveling vehicle body 11 during the calibration period is indicated by a single dotted line. In so doing, the parameter definer 101*c* estimates that a relatively important unevenness or a plurality of small uneven spots are present on the ground traveled by the traveling vehicle body 11, and determines that the traveling vehicle body 11 has traveled on rough terrain.

Figure 14D:
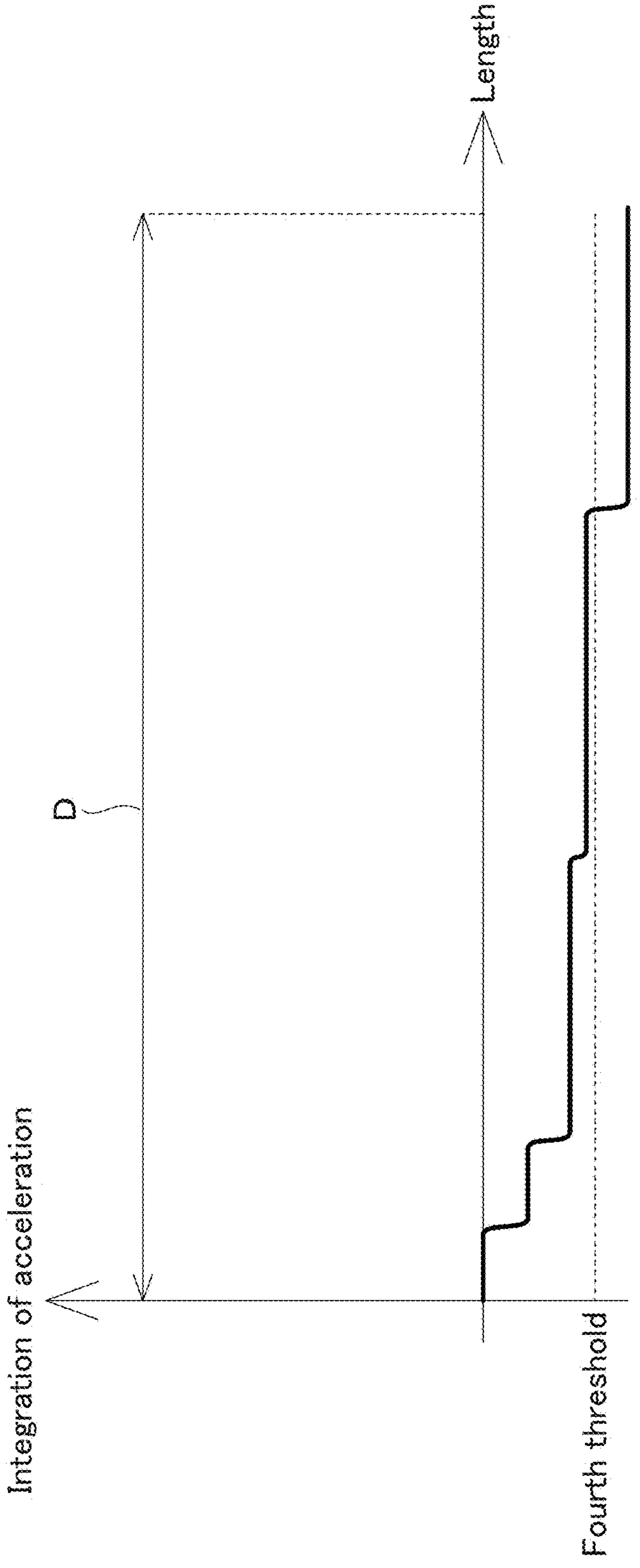
FIG. 14D is a diagram showing an example of a change of an integrated value of an acceleration of the posture of a traveling vehicle body traveling on rough terrain.

In the case where the integrated value of the acceleration of the posture of the traveling vehicle body 11 is equal to or lower than a predetermined threshold value (fourth threshold value) during the calibration period, the parameter definer 101*c* may determine that the traveling vehicle body 11 has traveled on rough terrain (see FIG. 14D). Specifically, in the case where the integrated value of the absolute value of the acceleration of the posture of the traveling vehicle body 11 is equal to or lower than the fourth threshold value during the calibration period, the parameter definer 101*c* determines that the traveling vehicle body 11 has traveled on rough terrain. In so doing, the parameter definer 101*c* estimates that a relatively important unevenness or a plurality of small uneven spots are present on the ground traveled by the traveling vehicle body 11, and determines that the traveling vehicle body 11 has traveled on rough terrain.

The determination manners for determining, by use of the aforementioned parameter definers 101*c*, whether the traveling vehicle body 11 has traveled on rough terrain are examples and, at least one of the aforementioned determination manners or combination of the aforementioned determination manners may be used to determine that the first traveling condition is not fulfilled, thus the traveling vehicle body 11 has traveled on rough terrain. The first to fourth threshold values mentioned above may be modified appropriately based on the information received via input by the input interface E.

Figure 15A:
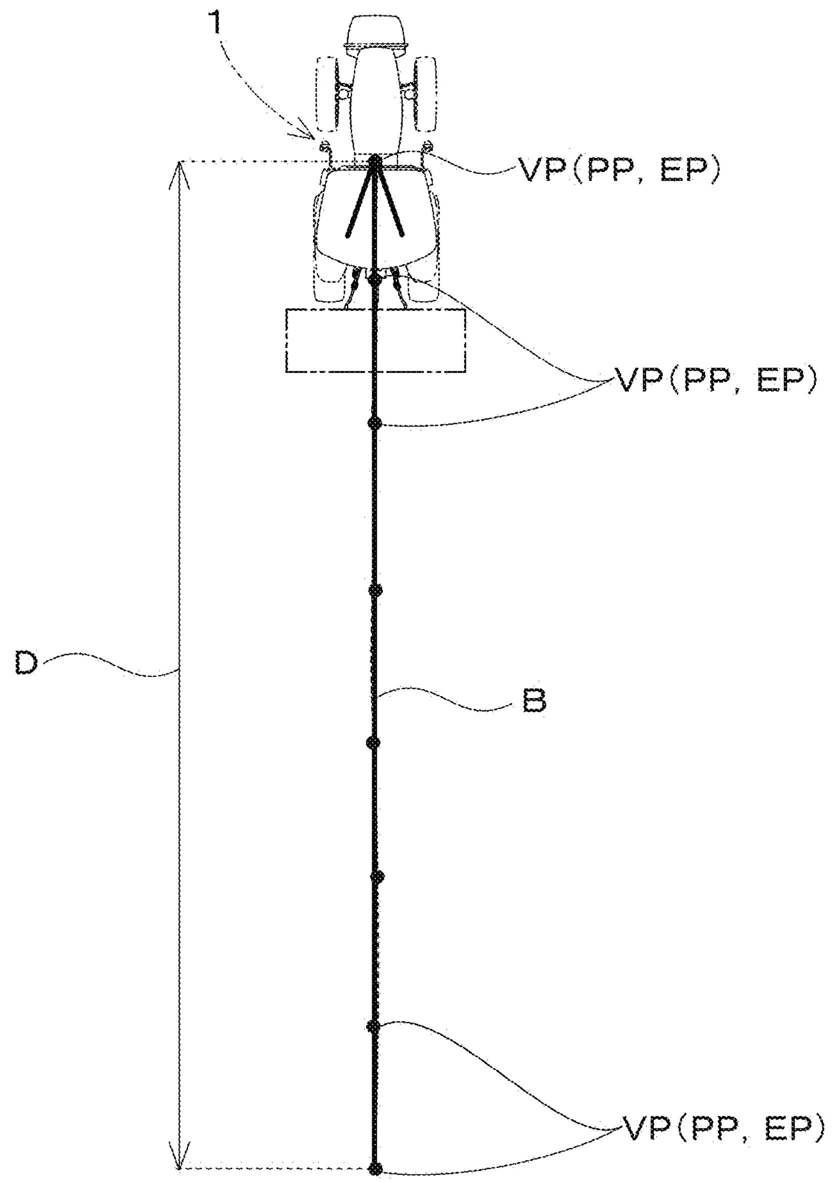
FIG. 15A is a diagram showing a traveling vehicle body in the state of traveling straight during calibration traveling.
Figure 15B:
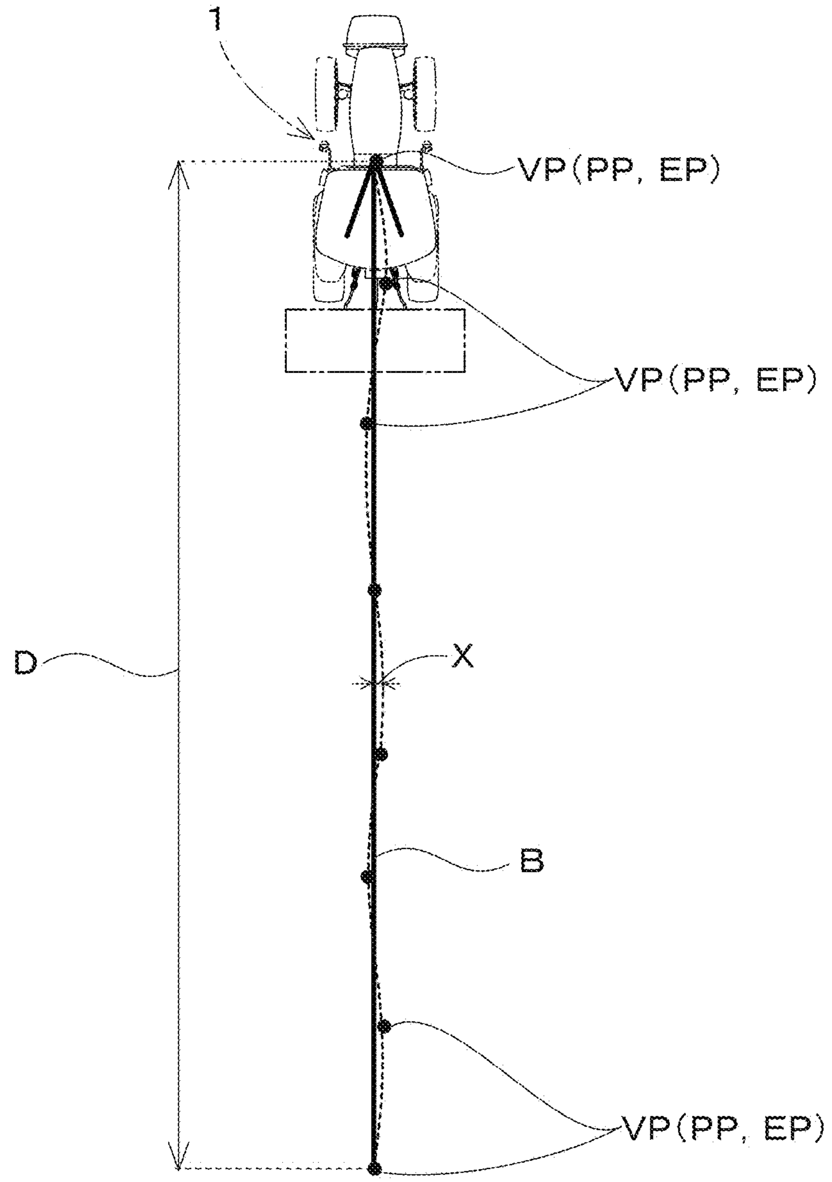
FIG. 15B is a diagram showing a traveling vehicle body in the state of traveling meandering during calibration traveling.

The parameter definer 101*c* may determine whether the traveling vehicle body 11 traveled in a straight line based on the behavioral information, and may not perform the definition process based on the traveling state in the case where the traveling vehicle body 11 does not travel straight (second traveling condition). For example, the parameter definer 101*c* determines that the second traveling condition is fulfilled in the case where the traveling vehicle body 11 travels substantially straight during the calibration traveling as shown in FIG. 15A, and does not perform the definition process when determining that the second traveling condition is not fulfilled in the case where the traveling vehicle body 11 meanders and does not travel straight during the calibration traveling as shown in FIG. 15B.

The parameter definer 101*c* acquires a linearity degree of the traveling vehicle body 11 which is behavioral information. The linearity degree is a predetermined evaluation value indicating a degree regarding whether the traveling vehicle body 11 travels in a straight line. Hereby, straight traveling refers to a moving path (traveling path) of the traveling vehicle body 11 which is a substantially straight. That is, in the case where the traveling path of the traveling vehicle body 11 is substantially straight, the parameter definer 101*c* evaluates the linearity degree as high, and in the case where the traveling vehicle body 11 meanders or turns, the parameter definer 101*c* evaluates the linearity degree as low. Thus, even in the case where the traveling vehicle body 11 has a heading maintained constant and moves slantly to the heading, the parameter definer 101*c* may evaluate the linearity degree as high.

The parameter definer 101*c* acquires the linearity degree of the traveling vehicle body 11 based on the positioning position PP measured by the positioning device 105. The parameter definer 101*c* acquires the positioning position PP during the calibration period, and acquires the linearity degree of the traveling vehicle body 11 based on how the positioning positions PP locate relatively along the straight line (in other words, how the moving path of the traveling vehicle body 11 is relatively straight). For example, the parameter definer 101*c* calculates the linearity degree based on variation relative to a predetermined reference line B of the positioning position PP during the calibration period, or on a deviation X relative to the reference line B (see FIGS. 15A and 15B). The reference line B is a straight line defined via the vehicle body orientation and/or the like at the start point of the calibration traveling.

The reference line B need only be at least a straight line, and the direction in which the reference line B extends is not limited to the front-rear direction of the traveling vehicle body 11 at the start point of the calibration traveling. For example, the reference line B may extend in an oblique direction from the traveling vehicle body 11 at the start point of the calibration traveling.

The parameter definer 101*c* need only be able to acquire the linearity degree during the calibration traveling, and may acquire the linearity degree by another method instead of or in addition to the positioning position PP. For example, in the case where a steering angle detector is provided for detecting the rotation direction and the rotation angle of the steering shaft 43, or in the case where the steering operation assembly 42 includes a sensor to detect the rotation direction and the rotation angle of the steering handle 42*a*, like the steering device 41 in FIG. 8, the parameter definer 101*c* may acquire the linearity degree of the traveling vehicle body 11 based on the rotation angle detected by the steering angle detector provided on the steering shaft 43 and by the sensor included in the steering operation assembly 42. That is, the parameter definer 101*c* acquires the linearity degree based on whether the rotation angle during the calibration period falls within a predetermined range from zero (steering angle is zero).

During the definition process, the parameter definer 101*c* may define traveling parameters for each of the plurality of the wheels 22, may compare the traveling parameters of the wheels 22, and may determine whether to control the storage device 102 to store the traveling parameters (third traveling condition). In such as case, during the definition process, the parameter definer 101*c* compares the traveling parameters of the wheels 22 and, in the case where the difference between the traveling parameters is equal to or more than predetermined, controls the storage device 102 not to store the traveling parameters as the third traveling condition is not fulfilled.

For example, the parameter definer 101*c* compares the traveling parameters of a pair of the wheels 22 (front wheels 22F, or rear wheels 22R). For example, in a case where the parameter definer 101*c* compares the traveling parameters of the pair of the front wheels 22F, the parameter definer 101*c* defines the traveling parameters of the first front wheel 22F1 (first traveling parameters) and the second front wheel 22F2 (second traveling parameters), and compares the difference between the first traveling parameter and the second traveling parameter. In the case where the difference between the first traveling parameter and the second traveling parameter is equal to or more than a predetermined difference (equal to or more than a predetermined determination value), the parameter definer 101*c* controls the storage device 102 not to store the first traveling parameter and the second traveling parameter.

For example, in a case where the parameter definer 101*c* compares the traveling parameters of the pair of the rear wheels 22R, the parameter definer 101*c* defines the traveling parameter of the first rear wheel 22R1 (third traveling parameters) and the traveling parameter of the second rear wheel 22R2 (fourth traveling parameters), and calculates the difference between the third traveling parameter and fourth traveling parameter. In the case where the difference between the third traveling parameter and the fourth traveling parameter is equal to or more than predetermined (equal to or more than a predetermined determination value), the parameter definer 101*c* not controls the storage device 102 not to store the third traveling parameter and the fourth traveling parameter.

In the case where the difference between the traveling parameters is equal to or more than a predetermined difference, the parameter definer 101*c* may control the storage device 102 not to store the traveling parameters including the other traveling parameters defined by the calibration traveling as well. Thus, in the case where the difference between the first traveling parameter and the second traveling parameter is lower than a determination value but the difference between the third traveling parameters and the fourth parameters is equal to or more than a determination value, the parameter definer 101*c* controls the storage device 102 not to store first to fourth traveling parameters.

While the parameter definer 101*c* calculates the difference between the traveling parameters and compares the traveling parameters in the aforementioned example, it is not limited to the comparison based on the difference between the traveling parameters. For example, the parameter definer 101*c* may calculate a ratio between the traveling parameters, the parameter definer 101*c* may control the storage device 102 not to store the traveling parameters when the ratio between the traveling parameters is equal to or more than predetermined value. For example, in the case where the ratio of the traveling parameters differs by about 10% or more, the parameter definer 101*c* controls the storage device 102 not to store the traveling parameters.

The parameter definer 101*c* need only compare the traveling parameters of at least two of the wheels 22 and, in the case where the front wheels 22F and the rear wheels 22R of the traveling device 21 have the same configuration and the outer diameters of the front wheels 22F and the rear wheels 22R have the same specifications, the parameter definer 101*c* may compare the traveling parameters of the front wheel 22F and the rear wheels 22R. For example, the parameter definer 101*c* may define the traveling parameters of the first front wheel 22F1 (first traveling parameters) and the traveling parameters of the first rear wheel 22R1 (third traveling parameters), and may compare the first traveling parameters and the third traveling parameters. The parameter definer 101*c* may define the traveling parameters of the first front wheel 22F1 (first traveling parameters) and the traveling parameters of the second rear wheel 22R2 (fourth traveling parameters), and may compare the first traveling parameters and the fourth traveling parameters.

Figure 16:
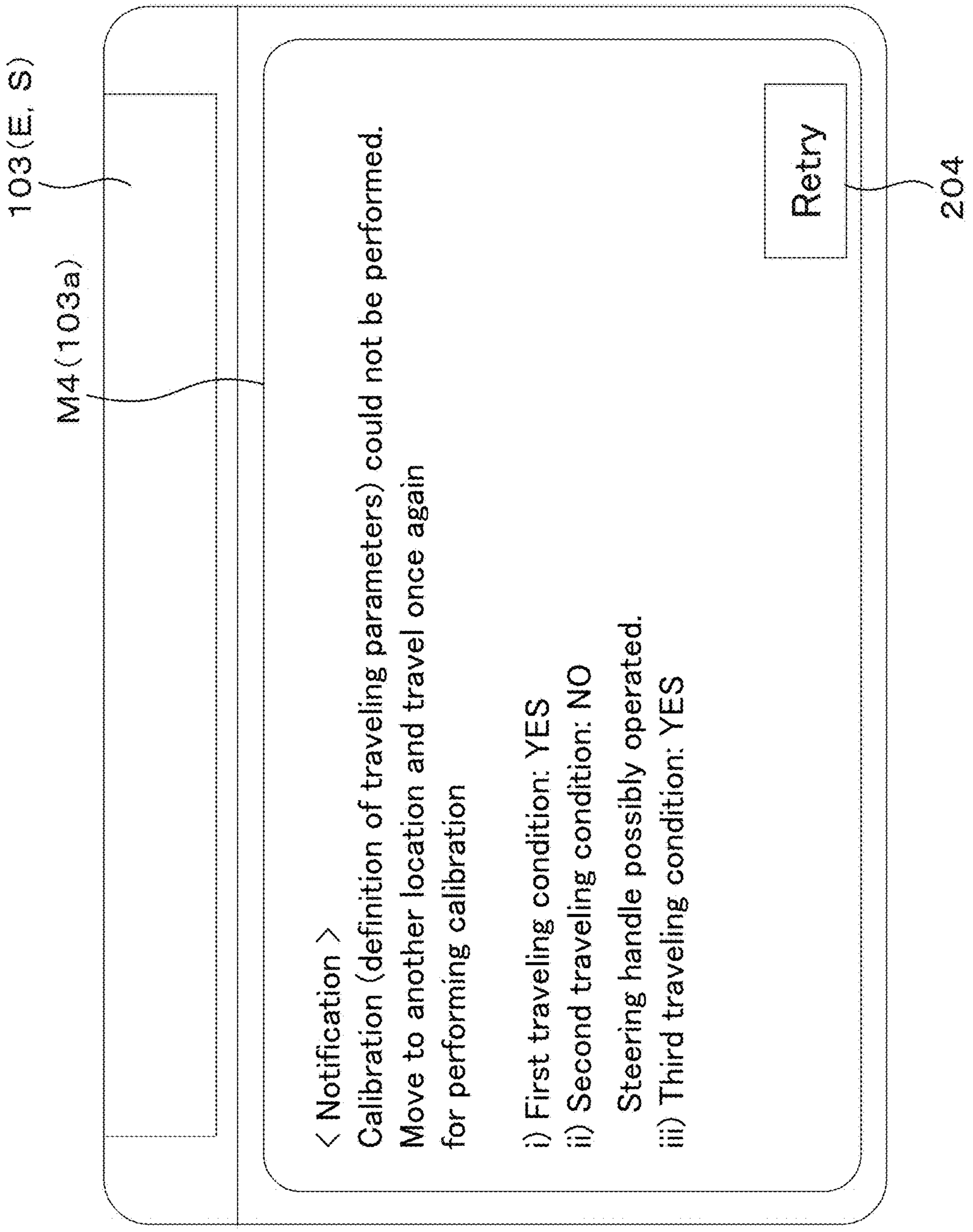
FIG. 16 is a diagram showing an example of a third notification screen.

In the case where the parameter definer 101*c* determines that at least one of the traveling conditions are not fulfilled, the display 103 notifies that the definition process will not be performed and that new traveling parameters will not be defined. In so doing, the parameter definer 101*c* may shift from calibration mode to standby mode, and the display 103 may prompt to perform calibration mode once again. Specifically, in the case where the parameter definer 101*c* determines that traveling conditions are not fulfilled, the controller 101 is configured or programmed to control the display 103 to display a third notification screen M4 (see FIG. 16) on the display screen 103*a* of the display 103. As shown in FIG. 16, the third notification screen M4 displays a message indicating “Calibration (definition of traveling parameters) could not be performed. Move to another location and travel once again for performing calibration”. In so doing, the third notification screen M4 may display the traveling conditions not fulfilled or the traveling conditions fulfilled during the calibration traveling. The third notification screen M4 includes a retry button 204, and the parameter definer 101*c* shifts to calibration mode when the retry button 204 is operated.

In the case where the pieces of attachment information indicate the fourth heavy object, the main controller 101*b* may be configured or programmed to control the coupling device 61 (lifting device 63) to raise (move up) the fourth heavy object to a predetermined height when the input interface E receives an input of a definition instruction. Specifically, the main controller 101*b* is configured or programmed to control the lifting device 63 to raise the fourth heavy object to a predetermined height at least during the calibration period. Accordingly, the parameter definer 101*c* is configured or programmed to perform the definition process based on the traveling state in the case where the main controller 101*b* has raised the fourth heavy object to a predetermined height.

Specifically, when the parameter definer 101*c* shifts to calibration mode, the main controller 101*b* raises the fourth heavy object to a height where the fourth heavy object is away from the ground (non-contact height) which is a predetermined height. For example, the storage device 102 may store the non-contact height of the fourth heavy objects, and the controller 101 may be configured or programmed to acquire the non-contact height preset for each of the fourth heavy objects and may raise the fourth heavy object to the non-contact height.

The non-contact height need only be at least a height where the fourth heavy object is away from the ground, may be the maximum height within a range the lifting device 63 can raise and lower the heavy object 71, and the height is not limited thereto. In the case where the lifting device 63 raises the fourth heavy object to a position higher than the non-contact height, the main controller 101*b* may be configured or programmed to control the lifting device 63 to lower the fourth heavy object to the non-contact height or even maintain the height.

Now, the assist device S will be discussed hereinafter. The assist device S may be embodied in the main controller 101*b*, for example. That is, a portion of the controller 101 including the main controller 101*b* may be configured or programmed to define the assist device S. The main controller 101*b* is configured or programmed to provide assist the traveling by controlling traveling of the traveling vehicle body 11 based on the traveling parameters. When the input interface E (for example, the acceleration operation tool 32, the braking operation assembly 52 and/or the like) receives the inputs of the traveling instructions (operation instructions), the main controller 101*b* is configured or programmed to control traveling via the traveling device 21 based on the traveling parameters stored in the storage device 102. The main controller 101*b* refers the parameter table in the storage device 102, and acquires traveling parameters corresponding to the pieces of attachment information stored in the memory. The main controller 101*b* is configured or programmed to control the traveling device 21 based on the acquired traveling parameters, the predetermined table or the computing equation and/or the like. Thus, the main controller 101*b* also indirectly assists the work of the working device 71A.

In discussing about a case where the input interface E is the acceleration operation tool 32 for example, the main controller 101*b* is configured or programmed to increase the rotation number of the electric motor 34 as the operation amount of the acceleration operation tool 32 increases, and to decrease the rotation number of the electric motor 34 as the operation amount of the acceleration operation tool 32 decreases, as described above. The traveling parameters indicate the relation between the rotation of the traveling device 21 and the traveling distance.

That is, when the traveling parameters have predetermined values (fixed values), as the operation amount of the acceleration operation tool 32 increases, the vehicle speed of the traveling vehicle body 11 increases, and on the other hand, as the operation amount of the acceleration operation tool 32 decreases, the vehicle speed decreases. When the operation amount of the acceleration operation tool 32 has a predetermined amount (fixed value) and the rotation number of the electric motor 34 has a predetermined value (fixed value), as the traveling parameters increase the vehicle speed increases, and on the other hand, as the traveling parameters decrease the vehicle speed decreases.

Thus, the main controller 101*b* reduces the electric power supplied to the electric motor 34 to reduce the rotation number of the electric motor 34, as the traveling parameters increases. On the other hand, the main controller 101*b* increases the electric power supplied to the electric motor 34 to increase the rotation number of the electric motor 34, as the traveling parameters decreases.

With this, as the traveling parameters increase, the vehicle speed of the traveling vehicle body 11 may be prevented from increasing in response to the operation amount of the acceleration operation tool 32 by reducing the rotation number of the electric motor 34, in comparison with the traveling parameters being relatively small, and as the traveling parameters decrease, the vehicle speed of the traveling vehicle body 11 may be prevented from decreasing in response to the operation amount of the acceleration operation tool 32 by increasing the rotation number of the electric motor 34, in comparison with the traveling parameters being relatively large. Accordingly, even when the traveling parameters increases or decreases, the traveling vehicle body 11 may reduce or prevent increasing or decreasing the vehicle speed in response to the operation amount of the acceleration operation tool 32.

In the case where the pieces of attachment information change, or where the attachment status of the heavy object 71 to the coupling device 61 changes, the mass and the weighted center of gravity of the entire working vehicle 1 including the heavy object 71 attached to the coupling device 61 change. With this, when the load acting on the wheels 22 increases, a distance H from the center of the axle of the wheel 22 to the terrain surface reduces with the tire 23 of the wheel 22 deforming (shrinking, see the right diagram of FIG. 17). Accordingly, the traveling distance for a single revolution of the wheel 22 may reduce with the traveling parameters reduced. On the other hand, when the load acting on the wheels decreases, the distance H from the center of the axle shaft of the wheels 22 to the terrain surface increases with the tire of the wheel 22 deforming (expanding). Accordingly, the traveling distance for a single revolution of the wheel 22 may increase with the traveling parameters increased (see the left diagram of FIG. 17).

Thus, when the traveling parameters increase, the load acting on the wheels 22 increases, which may increase the driving force acting on the wheels 22. On the other hand, when the traveling parameters decrease, the load acting on the wheels 22 may decrease, which may decrease the driving force acting on the wheels 22.

Figure 17:
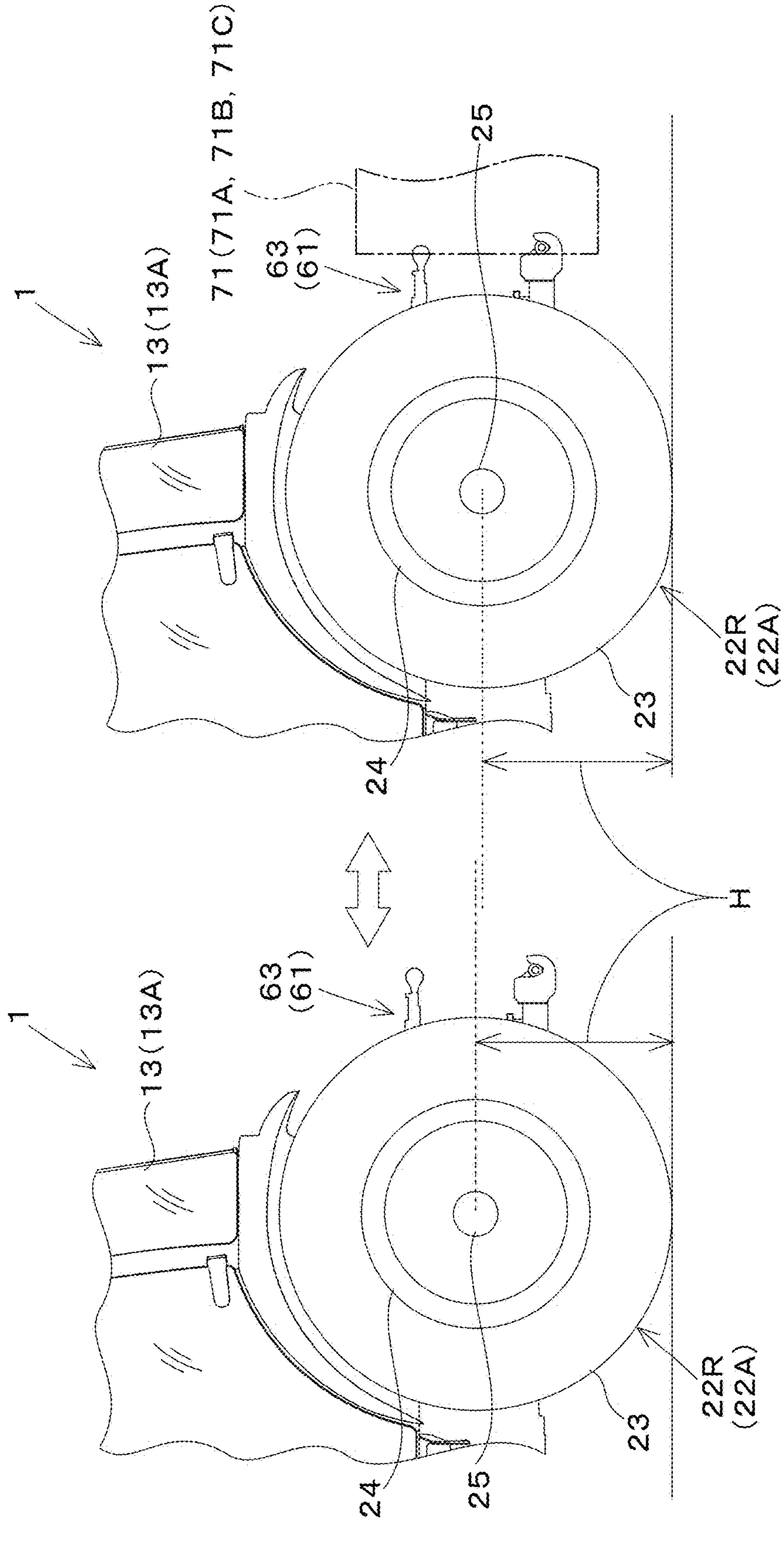
FIG. 17 is a diagram describing the deformation of the wheels due to a load acting thereon.

In addition, as the traveling parameters increase (as transiting from the left state to the right state shown in FIG. 17), the distance H to the terrain surface of the wheel 22 may decrease, and the terrain contact area of the tire 23 on the terrain may increase. As the traveling parameters decrease (as transiting from the right state to the left state shown in FIG. 17), the distance H to the terrain surface of the wheel 22 may increase, and the terrain contact area of the tire 23 on the terrain may reduce. That is, as the traveling parameters increase, the ground contact area of the tire 23 on the terrain may increase, and the driving force (or drag force) may increase with the lugs of the tire 23 biting more deeply into the ground. On the other hand, as the traveling parameters decrease, the ground contact area of the tires 23 on the terrain decreases, and the driving force (or drag force) may decrease with the lugs of the tires 23 biting less deeply into the ground.

Accordingly, in an example where the input interface E is a braking operation assembly 52, the main controller 101*b* is configured or programmed to control the braking mechanism 53 to increase the braking force as the operation amount of the braking pedals 52*a* and 52*b* increases, and to decrease the braking force as the operation amount of the braking pedals 52*a* and 52*b* decreases, as mentioned above.

That is, with the traveling parameters at a predetermined value, as the operation amount of the braking pedals 52*a* and 52*b* increase, the braking force increases and the braking distance of the traveling vehicle body 11 decrease, meanwhile, as the operation amount of the braking pedals 52*a* and 52*b* reduce, the braking force decreases and the braking distance of the traveling vehicle body 11 increase. When the braking pedals 52*a* and 52*b* have predetermined operation amount to cause the constant braking force, increase of the traveling parameters may cause the negative braking force or reduce the braking force to increase the braking distance, meanwhile, decrease of the traveling parameters may cause the negative driving force or increase the braking force thereby to decrease the braking distance.

As such, as the traveling parameters increase, the main controller 101*b* is configured or programmed to control the braking control valves (first braking control valve 55*a* and/or second braking control valve 55*b*) to decrease the opening thereof to increase the braking force. On the other hand, as the traveling parameters decrease, the main controller 101*b* is configured or programmed to control the braking control valves to increase the opening thereof to decrease the braking force.

With this, when the traveling parameters increases which decreases the braking force, the braking distance of the traveling vehicle body 11 may be prevented from being increased by increasing the braking force for the operation amount of the braking operation assembly 52 than the braking force for the same operation amount when the traveling parameters is relatively small. Similarly, when the traveling parameters decreases which increases the braking force, the braking distance of the traveling vehicle body 11 may be prevented from being decreased by decreasing the braking force for the operation amount of the braking operation assembly 52 than the braking force for the same operation amount when the traveling parameters is relatively large. Accordingly, the braking distance corresponding to the operation amount of the acceleration operation tool 32 may be prevented from being increased or decreased regardless of cases of the traveling parameters increased or decreased.

As mentioned above, when the input interface E is the steering operation assembly 42, the main controller 101*b* is configured or programmed to control the steering angle to be larger as the operation amount of the steering handle 42*a* is larger and controls the steering angle to be smaller as the operation amount of the steering handle 42*a* is smaller.

That is, when the traveling parameters have a predetermined value, as the operation amount of the steering handle 42*a* increases, the turning radius of the traveling vehicle body 11 decreases, and on the other hand, as the operation amount of the steering handle 42*a* decreases, the turning radius of the traveling vehicle body 11 increases. When the operation amount of the steering handle 42*a* has a predetermined amount of zero or more and the turning radius of the traveling vehicle body 11 is constant, as the traveling parameters increases, the drag force of the tire may increase, which increases the turning radius, on the other hand, as the traveling parameters decreases, the drag force of the tire may decrease, which decreases the turning radius.

Thus, as the traveling parameters increase, the main controller 101*b* is configured or programmed to control the opening of the steering control valve 44 decreased so as to decrease the steering angle, and on the other hand, the main controller 101*b* is configured or programmed to control the opening of the steering control valve 44 increased so as to increase the steering angle. With this, when the traveling parameters increase which decreases the drag force, the turning radius of the traveling vehicle body 11 may be prevented from being increased by increasing the steering angle for the operation amount of the steering handle 42*a* than the steering angle for the same operation amount of the steering handle 42*a* when the traveling parameters is relatively small. Similarly, when the traveling parameters decrease which increases the drag force, the turning radius of the traveling vehicle body 11 may be prevented from being decreased by decreasing the steering angle for the operation amount of the steering handle 42*a* than the steering angle for the same operation amount of the steering handle 42*a* when the traveling parameters is relatively large. Accordingly, the turning radius corresponding to the operation amount of the acceleration operation tool 32 may be prevented from being increased or decreased regardless of cases of the traveling parameters increased or decreased.

As described in the aforementioned example, the main controller 101*b* is configured or programmed to control the traveling device 21 based on the traveling parameters when the input interface E receives the inputs of traveling instructions (operation instructions). In addition to or instead of the aforementioned example, the main controller 101*b* may be configured or programmed to control the working device 71A based on the traveling parameters when the input interface E receives an input of work instructions (operation instructions).

In an example where the input interface E is the rotation operation tool 33, when the acceleration operation tool 32 has a predetermined operation amount and the electric motor 34 has a predetermined rotation number, the vehicle speed increases as the traveling parameters increase and the vehicle speed decreases as the traveling parameters decrease, as described above.

As the traveling parameters increase, the main controller 101*b* is configured or programmed to control the electric power supplied to the electric motor 34 to be increased so as to increase the rotation number of the PTO shaft 36. On the other hand, as the traveling parameters decrease, the main controller 101*b* is configured or programmed to control the electric power supplied to the electric motor 34 to be decreased so as to decrease the rotation number of the PTO shaft 36. With this, as the traveling parameters increase, the main controller 101*b* may be configured or programmed to increase the rotation number of the PTO shaft 36 so that a work speed of the working device 71A is increased, and as the traveling parameters decrease, the main controller 101*b* may be configured or programmed to decrease the rotation number of the PTO shaft 36 so that the work speed of the working device 71A is decreased. Accordingly, the work speed of the working device 71A may be modified corresponding to the vehicle speed so as to prevent divergence between the vehicle speed of the traveling vehicle body 11 and the work speed of the working device 71A regardless of cases of the traveling parameters increased or decreased.

While the main controller 101*b* is exemplified as the assist device S in the example embodiment described above, the assist device S need only perform at least assist for traveling or work or both based on the traveling parameters, and is not limited to the main controller 101*b*. For example, the assist device S may be the display 103 displaying information regarding the working vehicle 1 based on the traveling parameters.

The controller 101 is configured or programmed to include a vehicle speed rotation calculator 101*e* to calculate vehicle a speed based on the rotation of the traveling device 21 calculated by the rotation calculator 101*d* and on the traveling parameters. The vehicle speed rotation calculator 101*e* includes electric/electronic circuit(s), CPU(s), and program(s) and/or the like stored in the memory provided in the controller 101. The vehicle speed rotation calculator 101*e* refers to the parameter table of the storage device 102, and acquires the traveling parameters corresponding to the pieces of attachment information stored in the memory. The vehicle speed rotation calculator 101*e* calculates the vehicle speed based on the traveling parameters and on the rotation of the traveling device 21 calculated by the rotation calculator 101*d*.

In the present example embodiment, the vehicle speed rotation calculator 101*e* acquires the traveling parameters for each of the wheels 22, and calculates the vehicle speed based on the rotation number of each of the wheels 22 calculated by the rotation calculator 101*d*, and the traveling parameters. Specifically, the vehicle speed rotation calculator 101*e* multiplies the rotation numbers of the wheels 22 by the corresponding traveling parameters and calculates the vehicle speed of the wheels 22. The vehicle speed rotation calculator 101*e* calculates the vehicle speed of the working vehicle 1 based on the vehicle speed of the wheels 22. In the present example embodiment, since the rotation numbers of the wheels 22 are calculated by the rotation calculator 101*d* based on the rotations of the output shaft of the electric motors 34, the vehicle speed of the working vehicle 1 may be calculated based on the rotations of the output shafts of the electric motors 34 and on the traveling parameters.

For example, the vehicle speed rotation calculator 101*e* adopts the highest vehicle speed of the calculated vehicle speeds of the wheels 22 as the vehicle speed of the working vehicle 1. When calculating the vehicle speed of the working vehicle 1, the vehicle speed rotation calculator 101*e* outputs a vehicle speed signal indicating the vehicle speed to the display 103. When the display 103 acquires the vehicle speed signal from the vehicle speed rotation calculator 101*e*, the display 103 displays the vehicle speed of the working vehicle 1 based on the vehicle speed signal on the display screen 103*a*.

The vehicle speed rotation calculator 101*e* need only calculate the vehicle speed of the working vehicle 1 based at least on the rotation number of the wheels 22 calculated by the rotation calculator 101*d* and on the traveling parameters. For example, the vehicle speed rotation calculator 101*e* may adopts the average value or the median value of the vehicle speeds of the wheels 22 calculated by the vehicle speed rotation calculator 101*e* as the vehicle speed of the working vehicle 1, or may adopts the lowest vehicle speed as the vehicle speed of the working vehicle 1.

As mentioned above, in the case where the pieces of attachment information are different from one another, that is, in the case where the attachment status of the heavy object 71 to the coupling device 61 varies, the mass and the position of the weighted center of the entire working vehicle 1 including the heavy object 71 and/or the like attached to the coupling device 61 change. With this, the traveling distance regarding a single revolution of the wheels 22 may decrease due to deformation of the tires 23 of the wheels 22 (see FIG. 17).

In the case where the wheels 22 are replaced with another wheels 22 having different specifications, the distances H from the axle centers of the wheels 22 to the terrain contact surface of the wheels 22 may change and even when the wheels 22 have the same specifications, the distance H from the axle centers of the wheels 22 to the ground contact surface of the wheels 22 may change due to the height of the lugs varying. Even in such a case, the assist device S may use the traveling parameters corresponding to the pieces of attachment information to appropriately provide assistance to the traveling and/or the work.

In the case where traveling parameters corresponding to the pieces of attachment information stored in the memory have not been defined in the parameter table of the storage device 102, the assist device S may perform assist with traveling parameters newly defined via the parameter definer 101*c*. Alternatively, the assist device S may adopt the traveling parameters which matches at least one piece of attachment information with the other pieces of attachment information. Specifically, the assist device S may perform assist alternatively by adopting the traveling parameters not matching the second piece of attachment information but matching the third piece of attachment information and/or the fourth piece of attachment information.

For example, in the case where a mower is connected only to the lifting device 63 of the rear side of the traveling vehicle body 11 of the coupling device 61, and traveling parameters corresponding to the mower have not been stored in the parameter table, the assist device S may perform assist by using the traveling parameters of another heavy object 71 (for example, a cultivator or a ridging device) supported and moved up and down by the lifting device 63 of the rear side of the traveling vehicle body 11, of which traveling parameters has been stored in the parameter table.

In the case where a large bailing device is connected only to the lifting device 63 of the rear side of the traveling vehicle body 11 of the coupling device 61, and traveling parameters corresponding to the large molding device have not been stored in the parameter table, the assist device S may perform assist by alternatively adopting the traveling parameters of another heavy object 71 (for example, a carriage, a large battery assembly, and/or the like) supported and moved up and down by the lifting device 63 of the rear side of the traveling vehicle body 11, of which traveling parameters has been stored in the parameter table.

Figure 18:
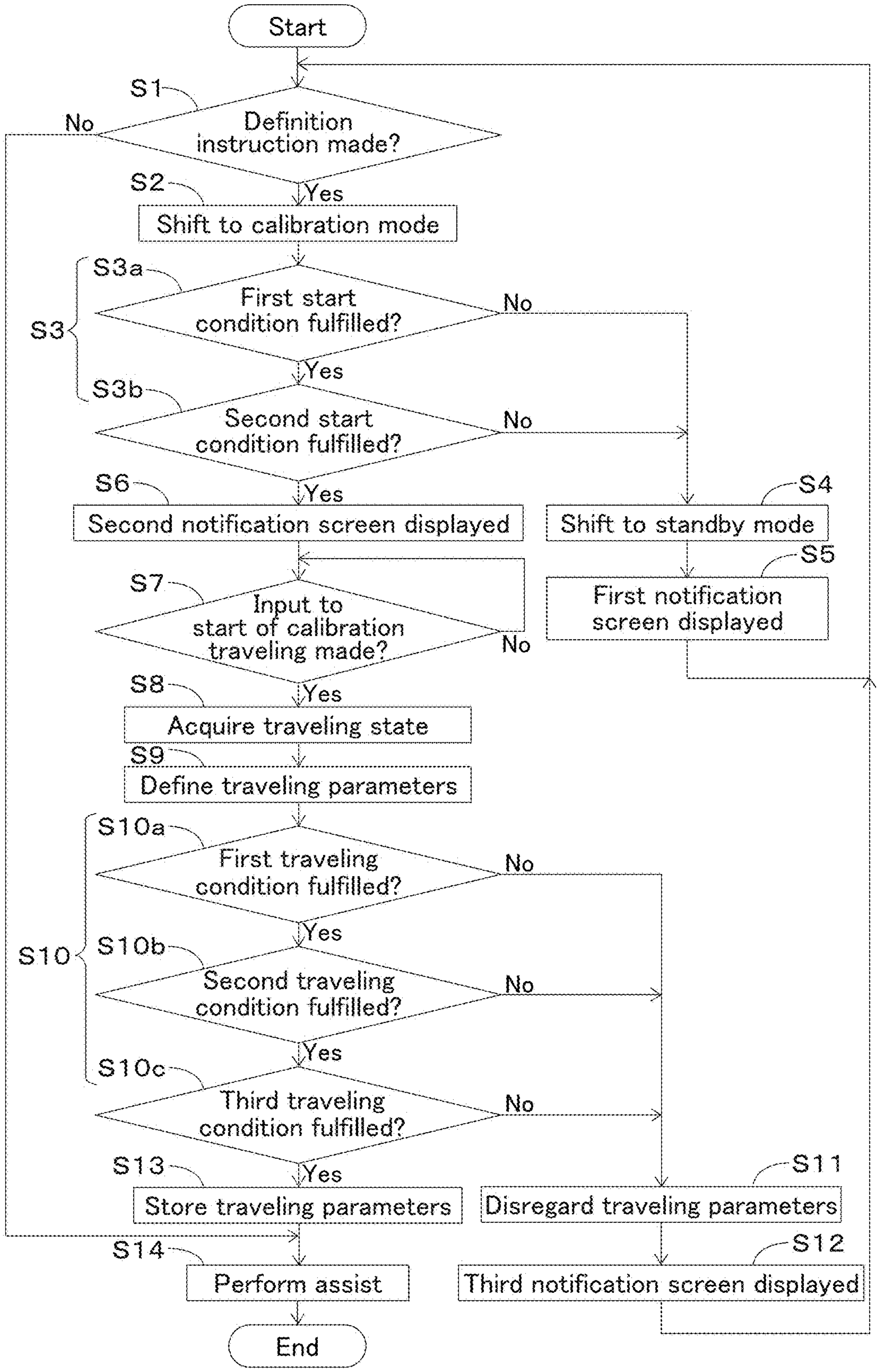
FIG. 18 is a flowchart showing an example of a series of steps performed by a controller including a definition process via a parameter definer.

With reference to FIG. 18, a series of steps of the definition process performed by the controller 101 including the parameter definer 101*c* will be described herein. The steps of FIG. 18 are performed by the controller 101 in accordance with the software program(s) stored in the memory or the storage device 102.

First, the parameter definer 101*c* determines whether an input of a definition instruction has been made via the input interface E (S1). Specifically, in the case where the display 103 displays the settings screen M1 when the working vehicle 1 is activated or when the wheels 22 of the traveling device 21 are replaced, the operator operates the display 103 (input interface E) to input a definition instruction. In the present example embodiment, the operator, for example, operates the parking brake 52*c* into the braking direction, and performs the definition instruction by operating the shift button 203 displayed on the settings screen M1.

When determining that the input of the definition instruction is made via the input interface E (YES at S1), the parameter definer 101*c* shifts to the calibration mode (S2). When shifting to the calibration mode (S2), the parameter definer 101*c* determines whether the start conditions are fulfilled (S3). In the present example embodiment, the parameter definer 101*c* determines whether the first start condition and the second start condition are fulfilled.

Specifically, the parameter definer 101*c* determines whether the first start condition is fulfilled, and whether the surrounding environment is appropriate based on the sensing results of the sensor 104 and/or on the detection results of the posture detector 106 and/or the like (S3*a*). In the case where the parameter definer 101*c* determined that the first start condition is not fulfilled (NO at S3*a*), the parameters definition portion 101*c* shifts from calibration mode to standby mode (S4). In so doing, the controller 101 is configured or programmed to control the display 103 to display the first notification screen M2 on the display screen 103*a* (S5) thereof. After the process of step S5, the parameter definer 101*c* returns to step S1.

When determining that the first start condition is fulfilled (YES at S3*a*), the parameter definer 101*c* acquires the state of the devices and pieces of equipment provided in the traveling vehicle body 11 which is the vehicle state of the traveling vehicle body 11, and determines whether the second start condition is fulfilled and whether the vehicle state is appropriate (S3*b*).

In the case where the parameter definer 101*c* determines that the second start condition is not fulfilled (NO at S3), the parameter definer 101*c* moves to step S4 and shifts from calibration mode to standby mode (S4). In the case where the parameter definer 101*c* determines that the second start condition is fulfilled (YES at S3*b*), the controller 101 is configured or programmed to control the display 103 to display the second notification screen M3 (S6) on the display screen 103*a* thereof.

Then, the parameter definer 101*c* determines whether an input of the start of the calibration traveling is made via the input interface E (S7). In the present example embodiment, the operator operates the start button 211 displayed on the second notification screen M3, and performs an input of the start of the calibration traveling by operating the acceleration operation tool 32. The operator may input the start of the calibration traveling only by operating the acceleration operation tool 32.

The parameter definer 101*c* acquires the actual traveling state of the traveling device 21 during the calibration traveling (S8). Specifically, after the rotation calculator 101*d* acquires that the calibration traveling starts and the working vehicle 1 travels the reference distance D, the rotation calculator 101*d* calculates the rotation of the traveling device 21 during the period from the start of the calibration traveling (start point) to the point after the traveling device 21 travels the reference distance D (end point). With this, the parameter definer 101*c* acquires, from the rotation calculator 101*d*, the rotation of the traveling device 21 which indicates the traveling state, calculated by the rotation calculator 101*d* during the period of calibration.

When acquiring the traveling state (S8), the parameter definer 101*c* defines the traveling parameters based on the traveling state (S9). Specifically, the parameter definer 101*c* calculates (defines) the traveling parameters of the wheels 22 by dividing the reference distance D by the rotations of the traveling device 21 (for example, the rotation number of the wheels 22).

When defining the traveling parameters (S9), the parameter definer 101*c* determines whether the traveling conditions are fulfilled (S10). In the present example embodiment, the parameter definer 101*c* determines whether the first to third traveling conditions are fulfilled.

Specifically, the parameter definer 101*c* determines whether the first travel condition is fulfilled and whether the traveling vehicle body 11 traveled on the rough terrain based on the behavioral information (S10*a*). In the case where the parameter definer 101*c* determines that the first traveling condition is not fulfilled (NO at S10*a*), the parameter definer 101*c* controls the storage device 102 not to store the defined traveling parameters, and disregards the traveling parameters (S11). In so doing, the controller 101 is configured or programmed to control the display 103 to display the third notification screen M4 (S12) on the display screen 103*a* thereof. After the process of step S12, the parameter definer 101*c* returns to step S1.

When determining that the first traveling condition is fulfilled (YES at S10*a*), the parameter definition position 101*c* determines whether the second traveling condition is fulfilled and whether the traveling vehicle body 11 traveled in a straight line based on behavioral information (S10*b*).

In the case where the parameter definer 101*c* determines that the second traveling condition is not fulfilled (NO at S10*b*), the parameter definer 101*c* moves to step S11, controls the storage device 102 not to store the defined traveling parameters, and disregards the traveling parameters (S11). In the case where the parameter definer 101*c* determines that the second traveling parameter is fulfilled (YES at S10*b*), the controller 101 compares each of the traveling parameters for the wheels 22, and determines whether the third condition is fulfilled (S10*c*).

In the case where the parameter definer 101*c* determines that the third traveling condition is not fulfilled (NO at S10*c*), the parameter definer 101*c* proceeds to step S11, controls the storage device 102 not to store the defined traveling parameters, and disregards the traveling parameters (S11). In the case where the parameter definer 101*c* determines that the third traveling condition is fulfilled (YES at S10*c*), the parameter definer 101*c* associates each of the traveling parameters with the respective one of the pieces of attachment information acquired from the memory by the information acquirer 101*a* and controls the storage device 102 to store the traveling parameters and the pieces of attachment information in an associated manner, and completes the definition process (S13).

When the parameter definer 101*c* completes the definition process at step S13, the assist device S performs assist based on the traveling parameters (S14), which are stored in the storage device 102 and corresponding to the pieces of attachment information acquired from the memory by the information acquirer 101*a*. In step S1, the confirmation button 202 of the settings screen M1 is not operated, for example, that is, when the parameter definer 101*c* determines that an input of the definition instruction is not made via the input interface E (NO at S1), the assist device S performs assist based on the traveling parameters which have stored in the storage device 102 for the pieces of attachment information acquired from the memory by the information acquirer 101*a* (S13).

Figure 19:
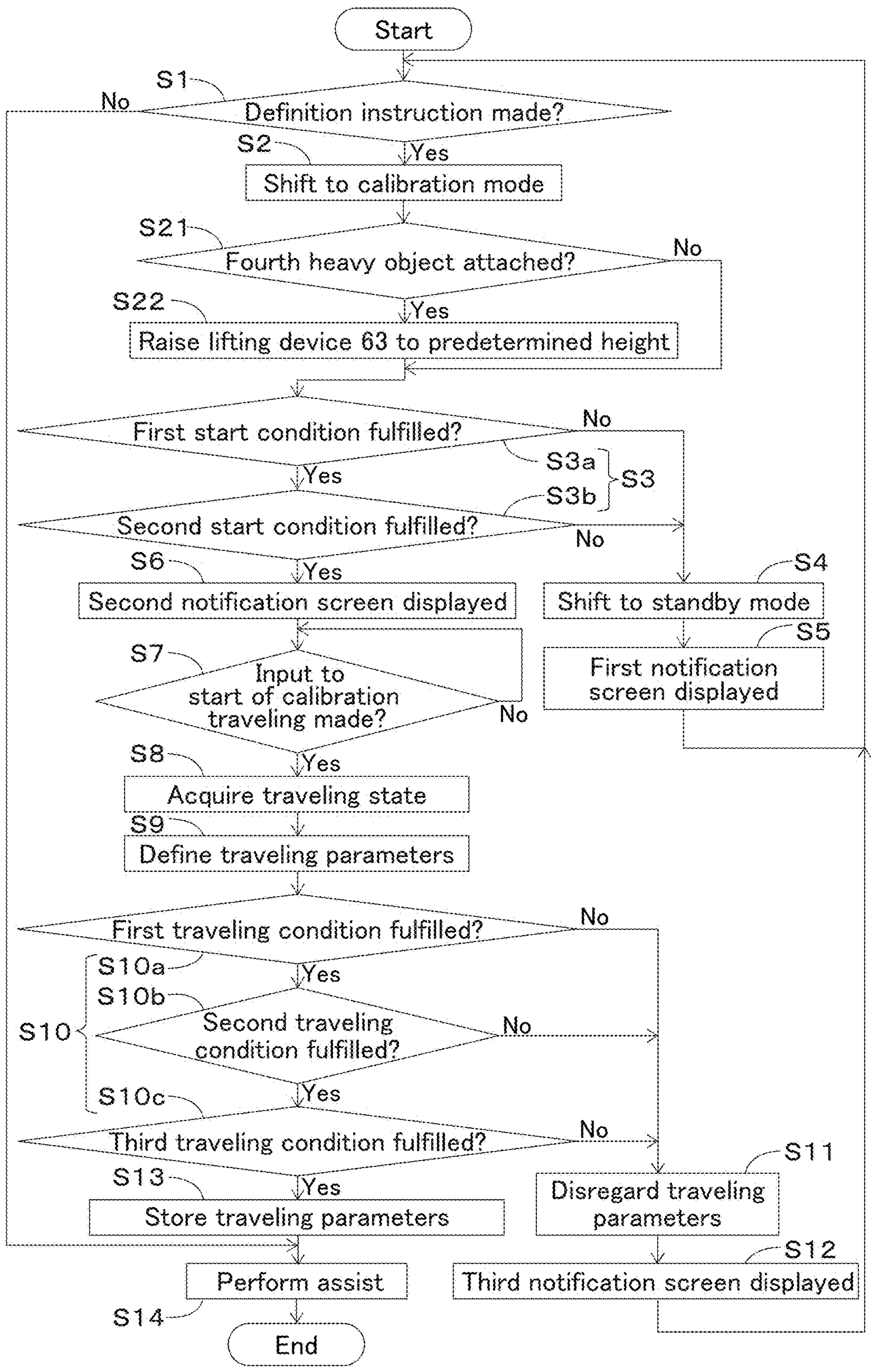
FIG. 19 is a flowchart showing another example of a series of steps performed by a controller including a definition process via a parameter definer.

The series of steps of the definition process performed by the parameter definer 101*c* of the controller 101, which are described above, only an example and not limited thereto. For example, when the pieces of attachment information indicate the fourth heavy object, the input interface E receives an input of a definition instruction, and the main controller 101*b* is configured or programmed to control the coupling device 61 (lifting device 63) to raise the fourth heavy object to a predetermined height, the main controller 101*b* may perform the process of steps S21 and S22 between steps S2 to S7 as shown in FIG. 19. In the example shown in FIG. 19, when the parameter definer 101*c* shifts to calibration mode at step S2 (S2), the main controller 101*b* determines whether a fourth heavy object is attached to the lifting device 63 (S21) before determining whether start conditions are fulfilled at step S3. Specifically, the main controller 101*b* refers to the pieces of attachment information acquired from the memory by the information acquirer 101*a*, and determines whether the fourth heavy object is attached to the lifting device 63 based on the fourth piece of attachment information included in the pieces of attachment information.

When the main controller 101*b* determines that the fourth heavy object is attached to the lifting device 63 (YES at S21), the main controller 101*b* is configured or programmed to control the lifting device 63 to raise the fourth heavy object to a predetermined height (S22). When the main controller 101*b* determines at step S22 that the fourth heavy object is not attached to the lifting device 63 (NO at S21), the parameter definer 101*c* proceeds to step S3.

Example embodiments of the present invention provide example embodiments of working vehicles according to the following items.

(Item 1) A working vehicle 1 includes a traveling vehicle body 11, a traveling device 21 to support the traveling vehicle body 11 such that the traveling vehicle body 11 is allowed to travel, a coupler 61 to couple a heavy object 71 to the traveling vehicle body 11, a memory or storage 102 to store information, a parameter definer 101*c* configured or programmed to perform a definition process to define a traveling parameter indicating a relation between a rotation of the traveling device 21 and a traveling distance of the traveling vehicle body 11 based on an actual traveling state of the traveling device 21, and store in the memory or storage 102, the traveling parameter associated with attachment information of the heavy object 71 coupled with the coupler 61, and an assistor S (101*b*) configured or programmed to assist either traveling or work or both based on the traveling parameters stored in the memory or storage 102.

According to the working vehicle 1 recited in item 1, the parameter definer 101*c* can define the traveling parameters based on the actual traveling state of the traveling device 21. Thus, although the relation between the rotation and the traveling distance of the traveling device 21 may vary in accordance with the load acting on the traveling device 21 from the heavy objects 71 coupled with the coupler 61, the assistor S (101*b*) can assist either traveling or work or both appropriately based on the traveling parameters.

(Item 2) The working vehicle 1 according to item 1, wherein the attachment information includes at least one of information indicating whether the heavy object 71 is coupled with the coupler 61 or information of the heavy object 71 being coupled with the coupler 61.

According to the working vehicle 1 recited in item 2, the parameter definer 101*c* can define the traveling parameters based on whether the heavy object 71 is coupled with the coupler 61 and/or which heavy object 71 is coupled with the coupler 61. Thus, the assistor S (101*b*) can provide assistance to the traveling and/or the work more appropriately by using the traveling parameters in accordance with the attaching state of the heavy object 71 coupled with the coupler 61.

(Item 3) The working vehicle 1 according to item 1 or 2, wherein the attachment information includes information indicating whether the heavy object 71 coupled with the coupler 61 is a first heavy object 71 located at a front side of the traveling vehicle body 11 or a second heavy object 71 located at a rear side of the traveling vehicle body 11.

According to the working vehicle 1 recited in item 3, although the load on the traveling device 21 may vary substantially depending on an attachment position where the heavy object 71 is coupled with the traveling device 21, the parameter definer 101*c* can define the traveling parameters based on the attachment position of the heavy object 71 (frontward or rearward of the traveling vehicle body 11). With this, the assistor S (101*b*) can provide assistance to the traveling and/or the work appropriately according to the attachment position of the heavy object 71.

(Item 4) The working vehicle according to any one of items 1 to 3, wherein the attachment information includes information indicating that the heavy object 71 coupled with the coupler 61 is a third heavy object 71 to be towed by the traveling vehicle body 11 or a fourth heavy object 71 to be supported and moved up and down by the coupler 61.

According to the working vehicle 1 recited in item 4, the parameter definer 101*c* can define the traveling parameters depending on the manner how the heavy object 71 is coupled with (or supported by) the traveling vehicle body 11. Especially, a heavy object 71 towed by the traveling vehicle body 11 is often relatively heavier than the heavy object 71 supported and moved up and down by the traveling vehicle body 11, and the load acting on the traveling device 21 may vary depending on whether the traveling vehicle body 11 tows the heavy object 71. With this, the assistor S (101*b*) can perform the assist the traveling and/or the work in accordance with the manner how the heavy object 71 is towed and/or supported by the traveling vehicle body 11.

(Item 5) The working vehicle 1 according to item 4, further includes an input interface E to receive an input of a definition instruction for the parameter definer 101*c* to perform the definition process, and a main controller 101*b* configured or programmed to control the coupler 61 to move up the fourth heavy object 71 to a predetermined height when the input interface E receives the input of the definition instruction in a case where the attachment information indicates the fourth heavy object 71, wherein the parameter definer 101*c* is configured or programmed to perform the definition process based on the traveling state when the main controller 101*b* moves up the fourth heavy object 71 to the predetermined height.

According to the working vehicle 1 recited in item 5, the parameter definer 101*c* can perform the definition process based on the traveling state where the fourth heavy object is raised to the predetermined height, in which the traveling parameters are defined while taking account of reducing a normal force to the fourth heavy object against gravity from the ground, and increasing the load on the traveling device 21. With this, it is possible to control the variations of the traveling state in the state where the fourth heavy object is raised to the predetermined height, and it is possible to improve the accuracy of the traveling parameters. Accordingly, the assistor S (101*b*) can provide assistance to the traveling and/or the work more appropriately by using the traveling parameters.

(Item 6) The working vehicle 1 according to any one of items 1 to 5, wherein the parameter definer 101*c* is configured or programmed to acquire behavioral information regarding a behavior of the traveling vehicle body 11 corresponding to the traveling state, and determine via the behavioral information whether to perform the definition process based on the traveling state.

According to the working vehicle 1 recited in item 6, the parameter definer 101*c* determines whether to perform the definition process based on the behavior of the traveling vehicle body 11 so as to control variations of the traveling state used in the definition process and define traveling parameters with relatively high accuracy.

(Item 7) The working vehicle according to item 6, wherein the parameter definer 101*c* is configured or programmed to determine based on the behavioral information whether the traveling vehicle body 11 has traveled on a rough terrain, and not perform the definition process based on the traveling state in a case where the traveling vehicle body 11 has traveled on the rough terrain. According to the working vehicle 1 related to item 7, the parameter definer 101*c* does not define traveling parameters based on the traveling state on the rough terrain. Thus, since there may be important variations in the traveling state on rough terrain and the accuracy of the traveling parameters may reduce, the assistor S (101*b*) can provide assistance to the traveling and/or the work more appropriately by using traveling parameters based on a traveling state the traveling vehicle body 11 is not a traveling state on the rough terrain.

(Item 8) The working vehicle according to item 6 or 7, wherein the parameter definer 101*c* is configured or programmed to determine based on the behavioral information whether the traveling vehicle body 11 has traveled straight, and not perform the definition process based on the traveling state in a case where the traveling vehicle body 11 has not traveled straight.

According to the working vehicle 1 related to item 8, in the case where the traveling vehicle body 11 meanders or turns, the variations of the traveling state may increase substantially. However, the parameter definer 101*c* can improve the accuracy of the traveling parameters since the parameter definer 101*c* defines the traveling parameters based on the traveling state having relatively small variations when the traveling vehicle body 11 travels straight.

(Item 9) The working vehicle 1 according to any one of items 1 to 8, wherein the parameter definer 101*c* is configured or programmed to determine whether to perform the definition process according to at least one of a surrounding environment of the traveling vehicle body 11 or to a vehicle state of the traveling vehicle body 11.

According to the working vehicle 1 recited in item 9, the parameter definer 101*c* can define traveling parameters with a relatively high accuracy based on the traveling state with less variations which is based on the surrounding environment and/or the vehicle state. Thus, the assistor S (101*b*) can provide assistance to the traveling and/or the work more appropriately via high accuracy traveling parameters.

(Item 10) The working vehicle 1 according to any one of items 1 to 9, wherein the traveling device 21 includes a plurality of wheels spaced away from one another in a front-rear direction or in a width direction, and the parameter definer 101*c* is configured or programmed to define a relation between rotation numbers of the plurality of wheels and the traveling distance of the traveling vehicle body 11 as the traveling parameters.

According to the working vehicle 1 recited in item 10, since the parameter definer 101*c* defines the relation between the rotation numbers of the wheels 22 and the traveling distance as the traveling parameters, the assistor S (101*b*) can appropriately provide assistance to the traveling and/or the work.

(Item 11) The working vehicle 1 according to item 10, wherein the parameter definer 101*c* is configured or programmed to define the traveling parameters, each of which corresponds to respective one of the plurality of the wheels during the definition process, compare the traveling parameters for the plurality of wheels one another, and determine whether to store each of the traveling parameters in the memory or storage 102.

According to the working vehicle 1 recited in item 11, the parameter definer 101*c* can easily and reliably remove the abnormal traveling parameters by comparing one with another of the traveling parameters of the wheels 22. With this, the assistor S (101*b*) can provide assistance to the traveling and/or the work appropriately with the accurate traveling parameters.

(Item 12) The working vehicle according to item 11, wherein the parameter definer 101*c* is configured or programmed to compare the traveling parameters for the plurality of wheels, and control the memory or storage 102 not to store the traveling parameters in a case where at least one of a difference or a ratio between the traveling parameters is equal to or more than a predetermined value.

According to the working vehicle 1 recited in item 12, it is possible to remove the abnormal traveling parameters via a relatively easy and simple process which calculates the difference and/or the ratio between the traveling parameters.

(Item 13) The working vehicle according to any one of items 1 to 12, further includes an electric motor 34 to generate rotational driving force to drive the traveling device 21, wherein the parameter definer 101*c* is configured or programmed to acquire the traveling state based on the rotational driving force generated by the electric motor 34, and perform the definition process based on the traveling state.

According to the working vehicle 1 recited in item 13, the parameter definer 101*c* can acquire traveling state via the rotational driving force of the electric motor 34. Thus, it is possible to obtain specific advantages in the electric working vehicle which travels by the electric motor 34 as discussed above.

(Item 14) The working vehicle 1 according to any one of items 1 to 13, further includes an input interface E to receive an input of traveling instruction regarding the traveling of the traveling vehicle body 11 via the traveling device 21, wherein the assistor S (101*b*) is a controller 101*b* configured or programmed to control the traveling device 21 based on the traveling parameters stored in the memory or storage 102 when the input interface E receives the input of traveling instruction.

According to the working vehicle 1 recited in item 14, the assistor S (101*b*) can realize accurate traveling with the traveling parameters defined by the parameter definer 101*c*, that is the relation between the actual rotation of the traveling device 21 and the traveling distance of the traveling vehicle body 11.

(Item 15) The working vehicle 1 according to any one of items 1 to 14, wherein the heavy object 71 is one of a working device 71A, a weight 71B, or a battery assembly 71C.

According to the working vehicle 1 recited in item 15, the heavy object 71 such as a working device 71A, a weight 71B, or a battery assembly 71C is rather heavy relative to other pieces of equipment or devices provided in the traveling vehicle body 11, and the change of load acting on the traveling device 21 increases based on whether and/or which type of the heavy object 71 is coupled with the traveling vehicle body 11, however, even in the case where the heavy object 71 is attached/detached, the assistor S (101*b*) can appropriately provide assistance to the traveling and/or the work.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:

a traveling vehicle body;

a traveling device to support the traveling vehicle body such that the traveling vehicle body is allowed to travel;

a coupler to couple a heavy object to the traveling vehicle body;

a memory or storage to store information;

a parameter definer configured or programmed to:

perform a definition process to define a traveling parameter indicating a relation between a rotation of the traveling device and a traveling distance of the traveling vehicle body based on an actual traveling state of the traveling device; and store in the memory or storage, the traveling parameter associated with attachment information of the heavy object coupled with the coupler; and an assistor configured or programmed to assist either traveling or work or both based on traveling parameters stored in the memory or storage;

an input interface; and a controller; wherein the attachment information includes information indicating that the heavy object coupled with the coupler is a third heavy object to be towed by the traveling vehicle body or a fourth heavy object to be supported and moved up and down by the coupler;

the input interface receives an input of a definition instruction for the parameter definer to perform the definition process;

the controller is configured or programmed to control the coupler to move up the fourth heavy object to a predetermined height when the input interface receives the input of the definition instruction in a case where the attachment information indicates the fourth heavy object; and the parameter definer is configured or programmed to perform the definition process based on the traveling state when the controller moves up the fourth heavy object to the predetermined height.

2. The working vehicle according to claim 1, wherein the attachment information includes at least one of information indicating whether the heavy object is coupled with the coupler, or information of the heavy object being coupled with the coupler.

3. The working vehicle according to claim 1, wherein the attachment information includes information indicating whether the heavy object coupled with the coupler is a first heavy object located at a front side of the traveling vehicle body or a second heavy object located at a rear side of the traveling vehicle body.

4. The working vehicle according to claim 1, wherein the parameter definer is configured or programmed to:

acquire behavioral information regarding a behavior of the traveling vehicle body corresponding to the traveling state; and determine via the behavioral information whether to perform the definition process based on the traveling state.

5. The working vehicle according to claim 4, wherein the parameter definer is configured or programmed to:

determine based on the behavioral information whether the traveling vehicle body has traveled on a rough terrain; and not perform the definition process based on the traveling state in a case where the traveling vehicle body has traveled on the rough terrain.

6. The working vehicle according to claim 4, wherein the parameter definer is configured or programmed to:

determine based on the behavioral information whether the traveling vehicle body has traveled straight; and not perform the definition process based on the traveling state in a case where the traveling vehicle body has not traveled straight.

7. The working vehicle according to claim 1, wherein the parameter definer is configured or programmed to determine whether to perform the definition process according to at least one of a surrounding environment of the traveling vehicle body or to a vehicle state of the traveling vehicle body.

8. The working vehicle according to claim 1, wherein the traveling device includes a plurality of wheels spaced away from one another in a front-rear direction or in a width direction; and the parameter definer is configured or programmed to define a relation between rotation numbers of the plurality of wheels and the traveling distance of the traveling vehicle body as the traveling parameters.

9. The working vehicle according to claim 8, wherein the parameter definer is configured or programmed to:

define the traveling parameters, each of which corresponds to respective one of the plurality of the wheels during the definition process;

compare the traveling parameters for the plurality of wheels to one another; and determine whether to store each of the traveling parameters in the memory or storage.

10. The working vehicle according to claim 1, further comprising:

an electric motor to generate rotational driving force to drive the traveling device; wherein the parameter definer is configured or programmed to:

acquire the traveling state based on the rotational driving force generated by the electric motor.

11. The working vehicle according to claim 1, wherein the input interface receives an input of traveling instruction regarding the traveling of the traveling vehicle body via the traveling device; and the assistor is a controller configured or programmed to control the traveling device based on the traveling parameters stored in the memory or storage when the input interface receives the input of traveling instruction.

12. The working vehicle according to claim 1, wherein the heavy object is one of a working device, a weight, or a battery assembly.

13. A working vehicle comprising:

a traveling vehicle body;

a traveling device to support the traveling vehicle body such that the traveling vehicle body is allowed to travel;

a coupler to couple a heavy object to the traveling vehicle body;

a memory or storage to store information;

a parameter definer configured or programmed to:

perform a definition process to define a traveling parameter indicating a relation between a rotation of the traveling device and a traveling distance of the traveling vehicle body based on an actual traveling state of the traveling device; and store in the memory or storage, the traveling parameter associated with attachment information of the heavy object coupled with the coupler; and an assistor configured or programmed to assist either traveling or work or both based on traveling parameters stored in the memory or storage;

the traveling device includes a plurality of wheels spaced away from one another in a front-rear direction or in a width direction; and the parameter definer is configured or programmed to define a relation between rotation numbers of the plurality of wheels and the traveling distance of the traveling vehicle body as the traveling parameters;

the parameter definer is configured or programmed to:

define the traveling parameters, each of which corresponds to respective one of the plurality of the wheels during the definition process;

compare the traveling parameters for the plurality of wheels to one another;

determine whether to store each of the traveling parameters in the memory or storage; and control the memory or storage not to store the traveling parameters in a case where at least one of a difference or a ratio between the traveling parameters is equal to or more than a predetermined value.

* * * * *